United States Patent [19]

Jones et al.

[11] Patent Number: 5,641,854
[45] Date of Patent: Jun. 24, 1997

[54] POLYMERIC VEHICLE FOR HIGH SOLIDS COATINGS

[75] Inventors: Frank N. Jones, Ann Arbor, Mich.; Shou-Kuan Fu, Shanghai, China; Jun Hua, Morganville, N.J.; Xiaoying Yuan, Webster, N.Y.

[73] Assignee: Eastern Michigan University, Ypsilanti, Mich.

[21] Appl. No.: 477,091

[22] Filed: Jun. 7, 1995

Related U.S. Application Data

[63] Continuation-in-part of PCT/US95/01058, Jan. 24, 1995, which is a continuation-in-part of Ser. No. 186,429, Jan. 25, 1994, abandoned.

[51] Int. Cl.$^6$ ............................................. C08G 63/02
[52] U.S. Cl. ...................... 528/128; 528/1; 528/480; 525/123; 525/442; 525/444
[58] Field of Search ...................... 428/1, 480; 525/123, 525/442, 444; 528/193, 272

[56] References Cited

U.S. PATENT DOCUMENTS

| | | | |
|---|---|---|---|
| 3,652,713 | 3/1972 | Okazaki et al. | 260/860 |
| 3,804,920 | 4/1974 | Cunningham et al. | 260/850 |
| 3,857,817 | 12/1974 | Henshaw et al. | 260/67 R |
| 3,994,851 | 11/1976 | Chang | 260/29.4 R |
| 4,072,662 | 2/1978 | van der Linde | 260/75 R |
| 4,104,240 | 8/1978 | Buter | 260/39 |
| 4,128,526 | 12/1978 | Borman | 260/40 R |
| 4,188,477 | 2/1980 | Smith et al. | 528/288 |
| 4,340,519 | 7/1982 | Kotera et al. | 523/414 |
| 4,459,401 | 7/1984 | Sekmakas et al. | 528/296 |
| 4,465,815 | 8/1984 | Chattha | 525/443 |
| 4,576,997 | 3/1986 | Trotter et al. | 525/444 |
| 4,631,320 | 12/1986 | Parekh et al. | 525/452 |
| 4,753,975 | 6/1988 | Vander Kooi, Jr. | 524/539 |
| 4,847,314 | 7/1989 | Tortorello et al. | 524/317 |
| 4,922,002 | 5/1990 | Calbo, Jr. et al. | 560/193 |
| 5,011,894 | 4/1991 | Robeson et al. | 525/437 |
| 5,025,061 | 6/1991 | Ishiodoya et al. | 524/539 |
| 5,041,476 | 8/1991 | Wilder | 524/80 |
| 5,043,192 | 8/1991 | Jones et al. | 430/109 |
| 5,057,392 | 10/1991 | McCabe et al. | 430/109 |
| 5,075,393 | 12/1991 | Thompson | 525/444 |
| 5,115,016 | 5/1992 | Dickens et al. | 524/513 |
| 5,134,222 | 7/1992 | Cooke et al. | 528/272 |
| 5,137,984 | 8/1992 | Kangas et al. | 525/411 |
| 5,143,985 | 9/1992 | Robeson et al. | 525/437 |
| 5,162,153 | 11/1992 | Cooke et al. | 428/373 |
| 5,162,455 | 11/1992 | Greene | 525/437 |
| 5,166,289 | 11/1992 | Yezrielev et al. | 525/433 |
| 5,171,778 | 12/1992 | Dekkers et al. | 524/539 |
| 5,194,569 | 3/1993 | Kim et al. | 528/206 |
| 5,210,155 | 5/1993 | Yezrielev et al. | 525/422 |
| 5,244,699 | 9/1993 | Jones et al. | 428/1 |
| 5,245,002 | 9/1993 | Kuo | 528/176 |
| 5,338,479 | 8/1994 | Panandiker et al. | 252/183.71 |

FOREIGN PATENT DOCUMENTS

| | | |
|---|---|---|
| 0 014 808 | 9/1980 | European Pat. Off. . |
| 0 418 631 | 3/1991 | European Pat. Off. . |
| 0419088 | 3/1991 | European Pat. Off. . |
| 25 00 308 | 7/1976 | Germany . |

OTHER PUBLICATIONS

"Encyclopedia of Polymer Science and Engineering" Second Edition vol. 11 (1988) pp. 649–655.

"100–Percent–Solids, Liquid Finish", Products Finishing 96 (1993).

Muizebelt et al., "Permeabilities of Model Coatings: Effect of Crosslink Density and Polarity," pp. 110–114, Polymeric Materials for Corrosion Control© 1986 American Chemical Society.

Wicks et al., Organic Coatings: Science and Technology, vol. II: Applications, Properties, and Performance, pp. 280–282, Wiley 1994.

Wojcik, "Low Viscosity Polyisocyantes for Higher Solids Coatings," Paper Presented at ACS Meeting, Mar. 1994.

*Primary Examiner*—Terressa Mosley
*Attorney, Agent, or Firm*—Fitch, Even, Tabin & Flannery

[57] ABSTRACT

This invention relates to a polymeric vehicle which is effective for providing a high solids formulated coating composition. The polymeric vehicle comprises a blend of at least one nonmesogenic substantially linear oligoester diol and at least one hardener which is a mesogenic polyol or crystalline polyol, which blend is effective for reaction with a crosslinker which is reactive with the nonmesogenic oligoester and hardener.

42 Claims, No Drawings

POLYMERIC VEHICLE FOR HIGH SOLIDS COATINGS

This application is Continuation-In-Part application of Ser. No. PCT/US95/01058 filed Jan. 24, 1995 which is a Continuation-In-Part application of Ser. No. 08/186,429 filed Jan. 25, 1994 now abandoned. This invention is directed to polymeric vehicles and formulated coating compositions for coating binders which are high in solids and minimize the use of organic solvents to effect viscosities which permit the application of such polymeric vehicles or formulated coating compositions to a substrate as a protective paint by existing commercial application equipment. More particularly, this invention is directed to polymeric vehicles and formulated coating compositions which compositions include a nonmesogenic substantially linear oligoester diol, a hardener and crosslinker. These compositions are very high in solids and low in volatile organic compounds, and provide a coating binder with extremely good film properties.

DESCRIPTION OF THE PRIOR ART AND BACKGROUND

One of the primary components in paint is the "film former" that provides a film for the protective function for a substrate coated with the paint. Film forming components of liquid paints include resins which have required organic solvents to provide the resins with suitable viscosities such that the paint can be applied by existing commercial application equipment. Use of organic solvents, however, raises at least two problems. In the past and potentially in the future, petrochemical shortages mitigate against the use of organic solvent in great volumes. Second, environmental concern mitigates against the use of organic solvents and requires such use be minimized.

Environmental concern has become increasingly important. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to volatile organic compounds (VOCs) which may be released to the atmosphere. The U.S. Environmental Protection Agency (EPA) has established guidelines limiting the amount of VOCs released to the atmosphere, such guidelines being scheduled for adoption or having been adopted by various states of the United States. Guidelines relating to VOCs, such as those of the EPA, and environmental concerns are particularly pertinent to the paint and industrial coating industry which uses organic solvents which are emitted into the atmosphere.

To reduce organic solvent content and VOCs, researchers have developed high solids coating compositions and powdered coating compositions. High solids compositions generally are liquid and are designed to minimize solvents. Powdered coating compositions are solid powders and generally eliminate solvents. While each have advantages, each coating composition has disadvantages.

Coating compositions which include high solids polymeric vehicles based upon polyesters have become popular. In high solid polyesters as opposed to "conventional" compositions which use organic solvents, high molecular weight generally needs to be achieved during crosslinking rather than being attained from the basic polyester polymer. Hence, high solids polyesters normally supply a greater number of reactive sites (predominantly hydroxyl groups) available for crosslinking. The resultant polymers typically exhibit 70–80% solids-weight when reacted stoichiometrically with isocyanate crosslinkers, but frequently yield empirical solids up to 12% lower, when crosslinked with melamine resins. Despite their reduced use of organic solvents, high solids polyester coating compositions can be produced on the same equipment and be employed in many of the same applications as lower solids "conventional" polyester coating compositions. Further, as a result of their many strengths such as ease of manufacturing and use, low volatile emissions, reduced energy requirements, greater application efficiency, lower handling and storage costs, and excellent physical properties, high solids polyester coating compositions have enjoyed spectacular growth in manufacture and use. They still require organic solvents, however, and are a source of VOCs.

Powder coatings and UV-curable coatings are desirable ultrahigh or 100% solids coatings. However, there are limitations as to the technique and the equipment which are used to apply the powdered composition.

To reduce solvent content and VOCs in polymeric vehicles and formulated coating compositions for paints, researchers have been driven by three major objectives: controlling the reactivity of the film forming components in the paint; keeping the viscosity of the components in the paint low to minimize the organic solvents in the paint and to keep the VOCs in the paint at the lowest possible level; and keeping the components in the paint at a low volatility to minimize VOCs.

One way to reduce VOCs is to further reduce organic solvent content and increase the solids level of the coating composition to an ultra high solids level. High viscosity is a major problem which needs to be solved in ultrahigh solids coatings. In high solids polyester coatings, the viscosity of concentrated polyester solutions depends on several variables. Molecular weight and molecular weight distribution are two important factors. According to polymer physics theory, the viscosity of polymers in the liquid state depends mainly on the average molecular weight and the temperature, so it is desirable to reduce average molecular weight for solventless polyester coating. The major factor controlling number average molecular weight ($M_n$) of a polyester is the mole ratio of dibasic acid/diol or polyol. A dibasic acid to diol or polyol ratio of the order of 2:3 is typical. However, loss of polyol during the production of the polyester can result in a significantly higher number average molecular weight than predicted from the starting ratio. It is necessary to add some extra glycol to compensate for loss. Further, in ultra high solids coatings, the low molecular weight fraction of resin in the polymeric vehicle may be volatile enough to evaporate when a thin film is baked. Such loss has to be counted as part of the VOC emissions.

The number of functional groups per molecule also affects the viscosity because of hydrogen bonding. Most oligomers or polymers require high functionality to achieve a highly crosslinked film and reasonable Tgs to have adequate film properties for most applications. The high functionality tends to increase the viscosity significantly.

An object of the invention is to provide a polymeric vehicle which will reduce or eliminate VOCs.

Another object of this invention is to provide polymeric vehicles which are not only low in VOCs, but which provide coating binders with good film properties such as hardness and impact resistance.

Yet another object of this invention is to control the viscosity to low levels at a specific shear rate of a liquid polymeric vehicle or liquid formulated coating composition without using organic solvents or water for such control.

Further, objects and advantages of the invention will be found by reference to the following description.

SUMMARY OF THE INVENTION

The invention provides a liquid polymeric vehicle which may be a solution or a dispersion and which polymeric vehicle is effective for providing a high solids formulated coating composition. The polymeric vehicle comprises a blend of at least one nonmesogenic substantially linear oligoester diol and at least one hardener which is a mesogenic polyol or a crystalline polyol which blend is effective for reaction with a crosslinker which is reactive with the nonmesogenic oligoester and hardener. In general the viscosity of the polymeric vehicle which includes a blend of the oligoester, hardener and crosslinker will be in the range of from about 0.1 to about 20 Pa.s at from about 20° C. to about 60° C. at a shear rate of about 1000 sec.$^{-1}$ in the absence of organic solvent. The polymeric vehicle comprises from about 10 to about 50 weight percent hardener, based upon the combined weight of the hardener, oligoester and crosslinker, from about 15 to about 50 weight percent oligoester and from about 10 to about 40 weight percent crosslinker. If the hardener is a mesogenic polyol, the mesogenic polyol is present in an amount effective to provide the polymeric vehicle from about 5 to about 50 weight percent mesogenic groups, based upon the weight of the mesogenic polyol.

The oligoester diol and/or mixture of such diols has a number average molecular weight in the range of from about 275 to about 3000 and a polydispersity index of not more than about 2.6 and preferably not more than about 2.2. The oligoester diol is liquid below about 50° C. when in the environment of the hardener and crosslinker. The oligoester is substantially linear which means it also may be linear. The oligoester diol has a main longitudinal chain which has chain segments having the structures —CH$_2$—, —O—, —C(=O)— and to a limited extent may have segments with structures —(R)CH— and —(R)$_2$C— wherein R is methyl, ethyl, propyl, isopropyl, isobutyl or normal butyl. The main longitudinal chain is terminated with hydroxyl groups, or a hydroxyl group may be on R if R is within four carbon atoms of the terminal carbon of the main longitudinal chain. The oligoester diol should not on average contain more than one branch (defined by R above) per molecule of diol residue in the main chain. Hence, an oligoester made from a mixture of neopentyl glycol and completely linear diol must have at least 50 mole percent of the total diol residue of completely linear diol residue in the main chain of the oligoester. Further, not more than about 8% of the number of hydrogen atoms along the main longitudinal chain may be substituted with carbon atoms. Alternatively, the branching by virtue of substitution such as R should not permit the branching index, as defined below, to be more than about 0.12. Generally R will be methyl.

In one aspect the hardener is a mesogenic polyol which has two or more hydroxyl groups and which forms a dispersion or a solution with the oligoester when it is a part of the formulated coating composition. The mesogenic polyol has mesogenic groups selected from the group consisting of general formulas I, II and III as set forth below:

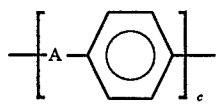

or covalently bonded combinations of general formula I;

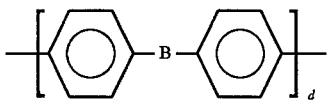

or covalently bonded combinations of general formula II; and combinations of Formulas I and II;

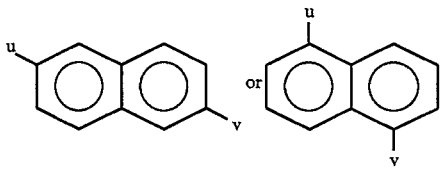

and covalent combinations of such napthalenic formulas; wherein

A is selected from the group consisting of $$-O-\overset{O}{\underset{\|}{C}}-, -\overset{O}{\underset{\|}{C}}-O-, -CH=N-, -N=CH-,$$

$$-O-CH_2-, -CH_2-O-, -\overset{CH_3}{\underset{|}{C}}=N-, -N=\overset{CH_3}{\underset{|}{C}}-,$$

covalent bond,

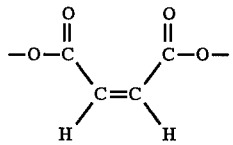

and

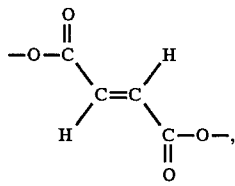

B is selected from the group consisting of $$-OC-, -\overset{O}{\underset{\|}{C}}-O-, -CH=N-, -N=CH-,$$

$$-O-CH_2-, -CH_2-O-, -\overset{CH_3}{\underset{|}{C}}=N-, -N=\overset{CH_3}{\underset{|}{C}}-,$$

covalent bond,

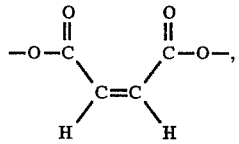

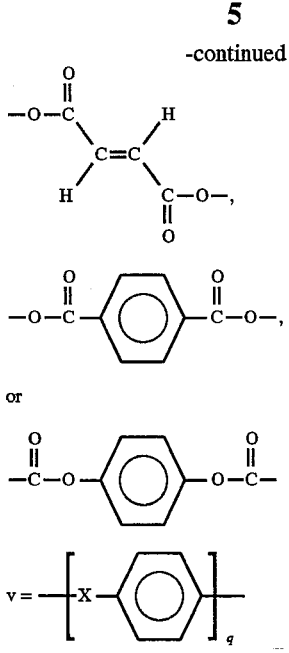

wherein
- c=an integer from 2 to 8;
- d=1 or 2;
- u=A;
- x=A; and
- q=an integer from 1 to 3.

In another important aspect, the hardener in the polymeric vehicle and the formulated coating composition is a crystalline polyol which has two or more hydroxyl groups, 5 to 200 carbon atoms, a number average molecular weight ($M_n$) in the range of from about 400 to 4000 and a polydispersity index of not more than about 2.6 and preferably not more than about 2.2. The crystalline polyol is insoluble in the formulated coating composition at storage and at application, but is miscible in the polymeric vehicle at the intended baking temperature of the formulated coating composition which provides the coating binder.

In paint technology, it is known that linearity is associated with the undesirable characteristic of crystallinity, but linearity has not been associated with the desirable characteristic of low viscosity. Many linear oligoester diols are crystalline at from about 25° C. to about 50° C., making problematic their formulation into coating compositions. In these cases, it may be desirable to copolymerize the linear monomers with branched monomers to reduce crystallinity. It has been found that branched monomers, however, tend to increase viscosity. Hence, the proportion of branched monomers copolymerized into an oligomer or polymer for a polymeric vehicle should be minimized to the lowest level that will prevent crystallization of the oligomer or polymer for the polymeric vehicle for the coating composition. In this connection, it has been surprisingly found that linear or substantially linear aliphatic oligoester diols, as defined herein, have low viscosities relative to their molecular weight. It also has been found that these oligoester diols exhibit shear thinning at high shear rates. In crosslinked coatings, such diols generally produce coatings that are too soft for most uses. It has been found, however, that the properties of these coatings may be enhanced to useful levels by blending a hardener that is a diol or polyol and which is crystalline and/or includes mesogenic groups, with the nonmesogenic oligoester diol and crosslinker. We have discovered that this blend may be made without increasing the viscosity of the blend so much that it can not be applied to a substrate.

Hence in another aspect, the invention provides a method for controlling the viscosity of the polymeric vehicle at a specific shear rate by controlling the relative amounts of substantially linear nonmesogenic oligoester diol and hardener (mesogenic polyol and/or crystalline polyol) such that when the nonmesogenic oligoester diol and hardener are combined with a cross-linker, the blend of the oligoester diol, hardener and crosslinker will be in relative amounts effective to provide a coating binder which will have a hardness of at least about B at a binder thickness of about one mil. In an important aspect, the polymeric vehicle of the invention will provide a coating binder with a hardness of at least about H. The viscosity of the blend will be in the range of from about 0.1 to about 20 Pa.s at about 20° to about 60° C. to provide a shear rate of at least about 1,000 and preferably in the range of about 1,000 to about $1 \times 10^6$ sec.$^{-1}$ in the absence of organic solvent.

DESCRIPTION OF THE PREFERRED EMBODIMENTS

"Polyester" means a polymer which has

linkages in the main chain of the polymer. "Oligomer" means a compound that is a polymer, but has a number average weight not greater than about 10,000 with or without repeating monomeric units. "Non-oligomeric" is a compound that does not have repeating monomer units along a main chain. "Crosslinker" means a di- or polyfunctional substance containing functional groups that are capable of forming covalent bonds with hydroxyl groups that are present on the oligoester diol and hardener which is the mesogenic polyol and/or crystalline polyol. Amino resins, polyisocyanate and epoxy resins are members of this class; melamine resins are a sub-class of amino resins. The crosslinking agent may be a blend, hence, there may be more than one substance which forms a blend of substances which forms covalent bonds with the hydroxyl groups of the oligoester and hardener. "Polymeric vehicle" means polymeric and resinous components in the formulated coating, i.e., before film formation, including but not limited to the substantially linear oligoester diol, mesogenic polyol, crystalline polyol and crosslinker. "Coating binder" means the polymeric part of the film of the coating after solvent has evaporated after baking and after crosslinking. "Formulated coating composition" means the polymeric vehicle and optional solvents, as well as pigments, catalysts and additives which may optionally be added to impart desirable application characteristics to the formulated coating and desirable properties such as opacity and color to the film.

As used herein "high solids" means at least or more than about 75 weight percent solids under ASTM test D-2369-92. A "high solids formulated coating composition" or high solids polymeric vehicle means a nonaqueous composition containing at least or more than about 75 weight percent solids as per ASTM test D-2369-92. In respect to a high solids polymeric vehicle according to the invention, the polymeric vehicle composition has a viscosity of not greater than about 0.3 Pa.s at a shear rate of about 25 sec.$^{-1}$ at a temperature of about 30° C. Generally the formulated coating composition according to the invention will not have more than about 200 g/L VOCs under ASTM test D-3960-93.

"Polydispersity index" (PDI) means the weight average molecular weight ($M_w$) divided by the number average molecular weight ($M_n$), PDI=$M_w/M_n$.

"VOC" means volatile organic compounds. "Low VOC" means less than about 200 grams VOCs per liter of polymeric vehicle not including water.

"Substantially linear oligoester diol" means an aliphatic diol that has a main longitudinal chain which has chain segments having the structures —$CH_2$—, —O—, —C(=O)— and to a limited extent may have segments with the structures —(R)CH— and —(R)$_2$C— wherein R is methyl, ethyl, propyl, isopropyl, isobutyl or normal butyl. The main longitudinal chain is terminated with a hydroxyl group, or alternatively, a hydroxyl group may be on R if R is within four carbon atoms of the terminal carbon atom of the main longitudinal chain. Most often R will be methyl. The oligoester diol should not on average contain more than one branch (defined by R above) per molecule of diol residue in the main chain. A substantially linear oligoester diol may be completely linear and is made by polymerizing linear dicarboxylic acids such as HOOC($CH_2$)$_n$COOH with linear diols such as HO($CH_2$)$_m$OH. The reaction mixture may contain, however, a proportion of "branched" comonomers, usually diols which bear branches (such as R set forth above) which are usually methyl. Not more than about 8 percent of the number of hydrogens along the main chain of the oligoester can be substituted with carbon atoms. Alternatively, the oligoester diol will have a branching index, as defined below, of not more than about 0.12.

The branching index is defined as $$\text{branching index} = \frac{(C_s + 2C_d) B_1}{C_1 + C_s + 2C_d} \; ;$$

Where $C_1$=the average number of linear segments per oligomer molecule;

$C_s$=the average number of segments with single branches per molecule;

$C_d$=the average number of segments with double branches per molecule;

$B_1$=the average length, in carbon and oxygen atoms, of branches.

"Diol" is a compound or oligomer with two hydroxyl groups. "Polyol" is a compound or oligomer with two or more hydroxyl groups. As used herein, "polymer" means a polymer with repeating monomeric units as described herein and includes oligomers as described herein.

"Solvent" means an organic solvent.

"Organic solvent" means a liquid which includes but is not limited to carbon and hydrogen which liquid has a boiling point in the range of from about 30° C. to about 300° C. at about one atmosphere pressure.

"Volatile organic compounds" are described by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions.

This includes any such organic compound other than then following, which have been determined to have negligible photochemical reactivity: methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;

(ii) Cyclic, branched, or linear, completely fluorinated ethers with no unsaturations;

(iii) Cyclic, branched, or linear, completely fluorinated tertiary amines with no unsaturations; and (iv) Sulfur containing perfluorocarbons with no unsaturations and with sulfur bonds only to carbon and fluorine. Water is not a VOC.

"Film" is formed by application of the formulated coating composition to a base or substrate, evaporation of solvent, if present, and crosslinking.

"Dispersion" in respect to a polymeric vehicle, formulated coating composition, or components thereof means that the composition must include a liquid and particles which particles are detectable by dynamic light scattering.

"Soluble" means a liquid dissolved in a liquid or a solid dissolved in a liquid. "Miscible" means a liquid which is dissolved or is soluble in a liquid.

"Dissolved" in respect to a polymeric vehicle, formulated coating composition or components thereof means that the material which is dissolved does not exist in a liquid in particulate form having at least about 5 weight percent particles having diameters greater than about 30 nM which are as measured by dynamic light scattering.

Adduct of monoxirane means the product of an addition reaction between a monoxirane with another compound with a functional group reactive with the oxirane, such as a hydroxyl group.

"Nonmesogenic" refers to compounds, oligomers or polymers which do not have the formulas I, II and III defined above as mesogenic in an amount of more than above 5 weight percent based upon the weight of the compound.

The polymeric vehicle comprises a blend of a nonmesogenic substantially linear oligoester diol and a hardener which is a mesogenic polyol and/or a crystalline polyol which blend is effective for a reaction with a crosslinker which is reactive with the nonmesogenic substantially linear oligoester and hardener. In general the viscosity of the polymeric vehicle which includes a blend of the oligoester, hardener and crosslinker will be in the range of from about 0.1 to about 20 Pa.s at from abut 20° C. to about 60° C. at a shear rate of about 1000 sec.$^{-1}$ in the absence of organic solvent, each ingredient being in an amount effective for providing a polymeric vehicle which will provide a coating binder with a pencil hardness of at least about B when applied to a substrate at thickness of about 1 mil dry. In an important aspect, the polymeric vehicle provides a coating binder having a pencil hardness of at least about H at a thickness of 1 mil dry. The polymeric vehicle comprises from about 10 to about 50 weight percent hardener, based upon the combined weight of the hardener, oligoester and crosslinker, from about 15 to about 50 weight percent oligoester diol and from about 10 to about 40 weight percent crosslinker. If the hardener is a mesogenic polyol, the mesogenic polyol is present in an amount effective to provide the polymeric vehicle with from about 5 to about 50 weight percent mesogenic groups, based upon the weight of the mesogenic polyol. If the hardener is a blend of mesogenic polyol and a crystalline polyol, the ratio of mesogenic polyol and crystalline polyol and amount of the blend are in amounts effective for providing the polymeric vehicle which provides a coating binder having a pencil hardness of at least about B when applied to a substrate at a thickness of about 1 mil dry.

The substantially linear oligoester diol has a number average molecular weight in the range of from about 275 to about 3000 and a polydispersity index of not more than about 2.6 and preferably not more than 2.2. It has a main longitudinal chain which has chain segments having the structure —$CH_2$—, —O—, —C(=O)—, —(R)CH— and —(R)$_2$C— wherein R is as described above with R generally being methyl. The oligoester diol should not on average contain more than one branch (defined by R above) per molecule of diol residue in the main chain. Not more than about 8 percent of the hydrogens along the main chain of the oligoester diol may be substituted with a carbon to provide the branching such as the methyl and ethyl branching. The branching should be minimized to the lowest level that will prevent crystallization of the oligoester diol at temperatures above the intended application temperature of the polymeric vehicle and formulated coating composition. This temperature is usually from about 25° C. to about 50° C. and preferably above about 0° C. The oligoester diol is liquid below about 50° C. when in the environment of the hardener and crosslinker.

The use of an oligoester in the polymeric vehicle is important because it has a low viscosity, as a part of the polymeric vehicle but has a sufficiently low evaporation rate such that the oligoester has at least about 93 weight percent solids when tested by ASTM D-2369. This minimizes the VOC content of the oligoester where the VOCs result from the molecular weight fractions of the oligoester that evaporate upon baking.

The substantially linear oligoester diol may be made by esterifying linear dicarboxylic acids such as HOOC($CH_2$)$_n$COOH (where n=2 to 14) with linear diols such as HO($CH_2$)$_m$OH (where m=2 to 16) using techniques such as catalyzed direct esterification, catalyzed transesterification or a catalyzed esterification reaction using dicyclohexylcarbodiimide (DCC). Zinc acetate may be used as a catalyst in the transesterification reaction and a solution of p-toluenesulfonic acid in pyridine may be used as a catalyst in the reaction using DCC. Diols which may be used to make the substantially linear oligoester diol include 1,3-propane diol, 1,4-butanediol, 1,5-pentanediol, 1,6-hexanediol, 1,9-nonanediol, diethylene glycol, triethylene glycol and tetraethylene glycol. Diacids which may be used to make the substantially linear oligoester diol include adipic acid, glutaric acid, azelaic acid, decanedioic acid, and dodecandioic acid. These monomers are completely linear and will provide completely linear oligoester diols. Completely linear oligoester diols do not have any branching at all.

While the oligoester diols of this invention may be completely linear, they only have to be substantially linear and monomers with some branching may be mixed with the completely linear monomers. Examples of monomers which may be mixed with the linear monomers to form substantially linear oligoester diols are 1,3-butanediol, 2-ethyl-1-6-hyexanediol, 2,2,4-trimethylpentanediol, neopentyl glycol, HOOCCH($CH_3$)$CH_2$$CH_2$COOH, and 2-ethyl-2-n-butyl-1,3-propanediol.

The substantially linear oligoester diols also may be made by the catalyzed transesterification reaction of the corresponding ester of the diacid with the diols as described above. The corresponding esters of the diacids include dimethyl azeleate, dimethyl glutarate, dimethyl adipate, dimethyl decanedioate and dimethyl dodecanedioate. Mixtures of two or more of the acids or esters thereof and two or more diols may be cotransesterified and may be used to make the substantially linear oligoester diol. Examples of such mixtures include a cotransesterified mixture of dimethyl azeleate with 1,4-butanediol and 1,6-hexanediol; a cotransesterified mixture of dimethyl azeleate and dimethyl adipate (1:1 molar ratio) and 1,4-butanediol which mixture provides a viscosity of 0.72 Pa.s at 3 rpm at 25° C.; a cotransesterified mixture of dimethyl azeleate and diethyl dodecanedioate (1:1 molar ratio) with the diols 1,4-butanediol, diethylene glycol and 1,10-decanediol (2:1:1 molar ratio). Typical linear oligoesters which may be used in the invention have the general formulas:

where n=2 to 12 and x=1 to 5;

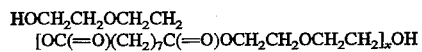

where x=1 to 5; and

where x=1 to 4.

Even numbered diacids (acids having even numbers of carbon atoms) tend to provide oligomers with melting points which are too high, except when used as mixtures. Hence, acids which have an odd number of carbon atoms are preferred.

In a preferred embodiment of the invention, the nonmesogenic linear oligoester diol in the polymeric vehicle has the general formula

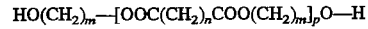

wherein p>1 and <6, m=2 to 16, n=0 to 12. In respect to this aspect of the invention, it has been found that oligoester diols where p=2, m=4, 7 and 10 and n=4 and 7 are particularly useful. The oligoester diol where m=7 and n=4 has a single, broad melting point at about 40° C. and its viscosity is low, such as 0.2 Pa.s at 50° C.

A substantially linear oligoester diol which is useful in the invention has the general formula

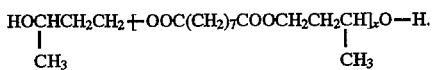

When $\bar{x}$ is about 2, the oligomer has a branching index of about 0.097. This monomer is an example of a substantially linear monomer which has small branches which, while not intending to be bound by any theory, advantageously will suppress the melting point of the oligoester diol.

Oligoester diols may be made by the catalyzed transesterification reaction of mixed dimethyl esters of glutaric, adipic and azelaic acids with 1,4-butanediol or 1,3-butanediol. The use of mixed acids provides another procedure for suppressing the melting point of the oligoester diol. Where oligoester diols were synthesized with mixed dimethyl esters and 1,4-butanediol, the viscosity of the liquid monomer ranges from about 0.245 to about 4.6 Pa.s at 25° C., when it has a number average molecular weight ranging from about 300 to about 1600. Where 1,3-butanediol was substituted for 1,4-butanediol, the viscosity of this liquid monomer ranges from about 0.295 Pa.s to about 2.92 Pa.s at 25° C., when it has a number average molecular weight ranging from about 350 to about 930.

The amount of branching in the oligoester diol to effect a melting point reduction and crystallinity reduction as described above varies with the particular combination of "linear" monomers and the characteristics of the branched comonomer. As a broad rule, the mole ratio of the branched diol to linear diol should not need to exceed 1:1 for branched diols having a single methyl side chain, such as 1,2-propanediol, or 0.67:1 for branched diols having an ethyl side chain, such as a 1,2-butanediol or two methyl side chains, such as neopentyl glycol.

In the aspect of the invention where the polymeric vehicle includes a mesogenic polyol hardener which has two or more hydroxyl groups, the mesogenic hardener forms a dispersion or a solution with the oligoester diol when it is a part of the formulated coating composition. When the mesogenic polyol forms a dispersion in the formulated coating composition, the number average molecular weight of the mesogenic polyol is in the range of from about 186 to about 4000 and has a polydispersity index of not more than about 2.6 and preferably not more than about 2.2. When the mesogenic polyol forms a solution in the formulated coating composition, the molecular weight of the mesogenic polyol is in the range of from about 186 to about 1000 and has a polydispersity index of not more than about 2.6 and preferably not more than about 2.2. The mesogenic polyol has mesogenic groups selected from the group consisting of general formulas I, II and III as set forth above.

In the aspect when the hardener is a mesogenic polyol and the mesogenic polyol is in solution in the formulated coating composition, the mesogenic polyol in the formulated coating composition is present in an amount effective to provide the polymeric vehicle with from about 10 to about 50 weight percent mesogenic groups based upon the weight of the mesogenic polyol.

Where the mesogenic polyol is dispersed in the formulated coating composition, the mesogenic polyol comprises from about 5 to about 50 weight percent mesogenic groups based upon the weight of the mesogenic polyol.

In either aspect, however, in general the ratio by weight percent of the mesogenic polyol to oligoester diol is in the range of from about 5/95 to about 50/50 and preferably from about 10/90 to about 30/70.

In an important aspect of the invention the mesogenic polyol has the general formula R-F-E-F-R     (Formula IV)

wherein
E is selected from the group consisting of

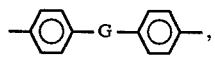,

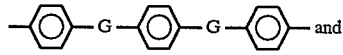 and

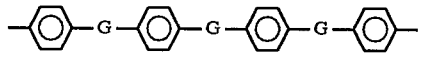

and G is selected from the group consisting of —COO—, —OOC—, —CH$_2$O—, —OCH$_2$—,

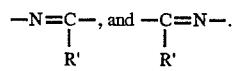

R' is selected from the group —CH$_3$ and —H.

F is selected from the group consisting of —O—, —COO— and —OOC—. R is an aliphatic C$_4$ to C$_{30}$ group which has at least one hydroxyl group. Any hydroxyl group which is a part of R is not in an alpha position to F, or in other words is spaced from F by at least one carbon atom.

In another important aspect, the mesogenic polyol has the general formula

R-F-E-F-R wherein

E is selected from the group consisting of

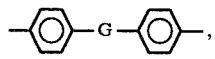,

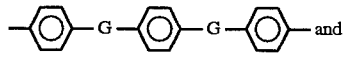 and

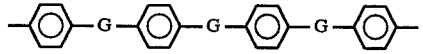

R', G and F are as set forth above and R is the adduct of a monoxirane having not more than 25 carbon atoms.

A particularly useful monoxirane to terminate a mesogenic diol, including the diol having the general formula IV, has the general formula

R" represents a mixture of aliphatic groups the three R" groups in the oxirane having a total of 8 carbon atoms. An adduct of the latter oxirane is particularly useful as R in the general formula R-F-E-F-R. The latter oxirane is commercially available from the Exxon Chemical Company under the name of Glydexx N-10®. Hence, when E and F are such that their combination provides

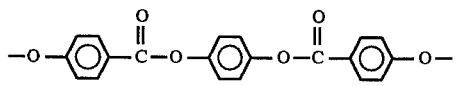

and Glydexx N-10® (as an adduct) terminates each end of the E, F combination to provide the R of the general formula R-F-E-F-R for one mesogenic diol, a particularly preferred mesogenic oligomer having the following formula is provided.

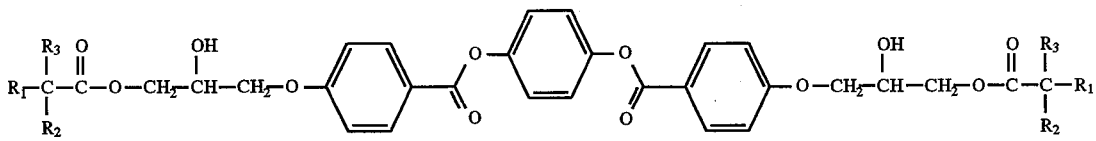

$R_1 + R_2 + R_3 = C_8H_{17}$

The polymeric vehicle comprises a blend of the linear oligoester diol and the mesogenic polyol of the general formula R-F-E-F-R (IV) or monoxirane adduct terminated diols of formula R-F-E-F-R as set forth above.

The mesogenic diol or polyols as set forth in formula IV are made by reacting a mesogenic diol such as

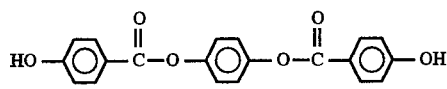

with an halogenated alcohol such as $Br(CH_2)_6$—OH to provide an aliphatic terminated mesogenic diol as set forth in formula IV. Aliphatic terminated diols may be derived from epoxies such as Glydexx N-10® by reacting a diol with the epoxy to provide the mesogenic polyol as follows.

crystalline polyol is a liquid and is miscible with the formulated coating composition at a temperature of at least about 80° C., and preferably in the range of from about 100° C. to about 175° C. The crystalline polyol displays one or more first order transitions at from about 80° C. to about 175° C. by DSC and displays crystallinity by WAXS. It is insoluble in the formulated coating composition at storage and at application, but is miscible in the polymeric vehicle at the intended baking temperature of the formulated coating composition which provides the coating binder. Preferably the crystalline polyol has a melting point of from about 5° C. to about 40° C. lower than the intended baking temperature of the formulated coating composition or the curing temperature of the polymeric vehicle. The latter baking temperature generally ranges from about 70° to about 175° C. Examples of crystalline polyols include the following.

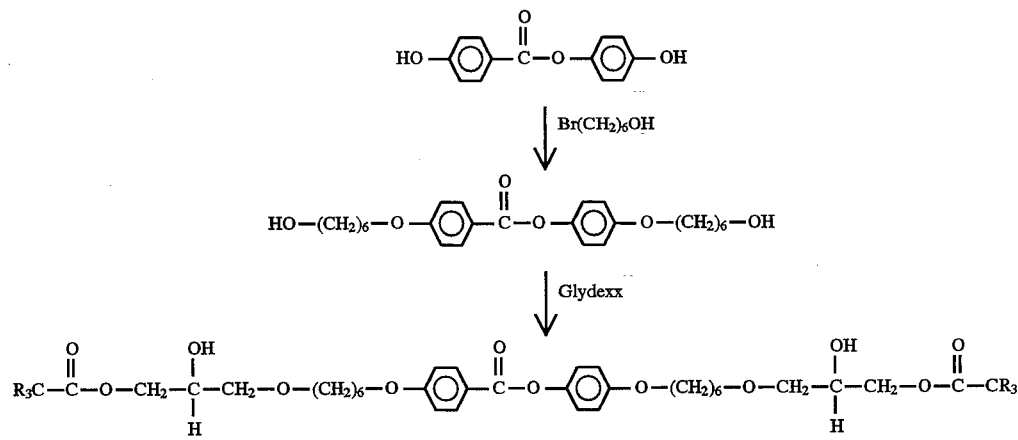

In another aspect of the invention, the hardener is a crystalline polyol which may be an oligomer or may be nonoligomeric and which polyol which consists essentially of carbon, hydrogen, oxygen and nitrogen atoms, has two or more hydroxyl groups and has from 5 to about 200 carbon atoms. If it has nitrogen atoms, these atoms will be a part of an amide, urea or amidine group. If the crystalline polyol is an oligomer, it has a number average molecular weight in the range of from about 400 to about 4000 and a polydispersity index of not more than about 2.6 and preferably not more than about 2.2. If the crystalline polyol is not oligomeric, the crystalline polyol has a molecular weight in the range from 120 to about 500.

Crystalline polyols of the invention are non-phenolic. Non-phenolic means that, in the aspect of the invention where the crystalline polyol contains an aromatic ring such as a benzene ring, the crystalline polyol does not have hydroxyl groups attached directly to the benzene ring.

The crystalline polyol is dispersed in the polymeric vehicle and the formulated coating composition and has a solubility in the formulated coating composition of not more than about 10 g/L at from about 0° C. to about 40° C. The

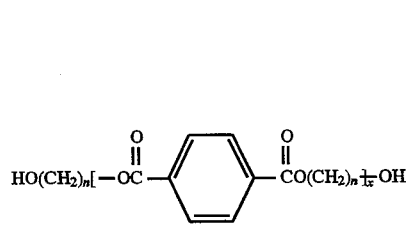

where $n=2$ through 12 and $x=1$ through 20.

$C(CH_2OH)_4$ and $RC(CH_2OH)_3$ are crystalline polyols where R is methyl, ethyl, propyl and butyl.

Another crystalline polyol is $HOCH_2(CHOH)_4CH_2OH$.

Yet another example of a crystalline polyol is

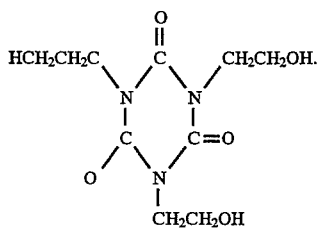

The polydispersity index of the substantially linear oligoester may be obtained by synthesizing the oligomer through a direct esterification reaction, a transesterification reaction or by an esterification reaction using reactants such as dicyclohexylcarbodiimide (DCC). Careful use of these techniques can yield products with a polydispersity index as low as 1.4. The polydispersity index of the oligoester and the mesogenic polyol may be lowered to levels below 1.4 by purification of the oligoester product such as by extraction of the volatile low molecular weight fractions or by vacuum stripping of such fractions. Using these techniques a polydispersity index of 1.1 or even lower may be obtained.

The crosslinker may be solid, but generally is a liquid. In either circumstance, the crosslinker is miscible or soluble in a blend of oligoester diol and hardener without raising the viscosity of the blend of the oligoester diol/hardener/crosslinker or the formulated coating composition above the range of from about 0.1 to about 20 Pa.s at about 20° to 60° C. at a shear rate of at least 1000 sec.$^{-1}$ in the absence of organic solvent. The crosslinker has a functionality which is reactive with active hydrogens such as the hydroxyl groups of the oligoester and hardener and should be effective to provide a coating binder with a hardness of at least about B and in an important aspect, at least about H at a binder thickness of about 1 mil.

To provide an effective coating binder, the polymeric vehicle comprises at least about a stoichiometric amount of crosslinker which will react with the hydroxyls of the oligoester and hardener. The crosslinker may be a polyisocyanate which generally are not blocked because blocking will raise the viscosity of the isocyanate such that it will not be functional or useful in the practice of the invention. Amino resins (usually made from amidines, ureas or amides by reaction with formaldehyde and subsequently with an alcohol) also may be used as a crosslinker which will react with the hydroxyls of the linear oligoester and hardener which is a polyol. The crosslinker has an average functionality reactive with the hydroxyls of the oligoester and hardener of greater than about 2.4. When it is a liquid, the crosslinker generally has a viscosity of less than about 3.0 Pa.s at about 25° C., continues to be a liquid at about 10° C., and is miscible with the oligoester and hardener. Suitable crosslinkers include, but are not limited to melamine formaldehyde types such as hexakis (methoxymethyl) melamine resin (HMMM) (sold as "Cymel 303" and "Resimene-747") and other amino resins as described in Wicks, Jones and Pappas "Organic Coatings: Science and Technology"PP 83–103, Wiley Interscience, 1992. Additionally, as previously stated, the crosslinker may be solid under certain conditions as long as it is soluble in the oligoester diol/hardener blend and does not increase the viscosity of the oligoester diol/hardener/crosslinker blend or formulated coating composition above the aforedescribed range. These crosslinkers include a hexakis (methoxymethyl) melamine (HMMM) resin which sometimes appears as a solid, is highly alkylated and has the general formula:

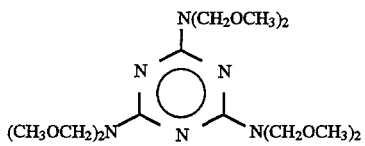

The latter HMMM resin appears as a waxy solid with a melting point in the range of about 30° C. and is sold by Cytec Chemical Company under the name Cymel 300. A similar melamine resin which sometimes appears to be a solid at about 25° C. and which can be used in the invention is a highly monomeric, highly methylolated hexamethylolated melamine formaldehyde resin which is sold by Monsanto Chemical Company under the designation HM-2612.

A particularly useful crosslinker includes a blend of polyisocyanates based on hexamethylene diisocyanate (sold as Luxate XHD 0700 by Olin Corporation) and thought to be a mixture of the following structures

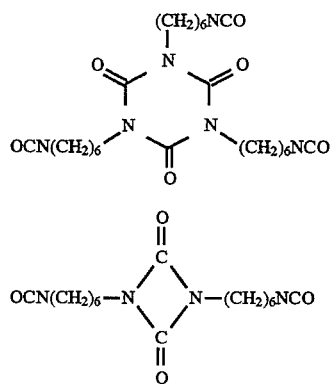

Particularly useful crosslinkers are blends of polyisocyanates and melamines. A particularly useful blend comprises a blend of melamine and Luxate® XHD 0700 in a ratio such as 2.0 parts melamine to 0.65 Luxate® to 0.22 Luxate® also is a particularly useful crosslinker.

The reaction between the oligoester, hardener and the crosslinker which provides the coating binder is a catalyzed reaction. Typical catalysts for isocyanate crosslinking reactions include soluble tin catalysts such as dibutyl tin dilaurate and tertiary amines such as diazabicyclo [2.2.2] octane and zinc salts of organic acids. Typical catalysts for the amino resin crosslinking reactions include para toluene sulfonic acid (p-TSA), dodecyl benzene sulfonic acid and dinonyl nathphalene disulfonic acid. Typically the catalyst comprises from about 0.3 to about 1.5 weight percent of the blend of oligoester and crosslinker, based upon the weight of the oligoester, crosslinker and catalyst.

The method of controlling the viscosity of the polymeric vehicle and formulated coating composition at a particular shear rate is practiced by providing the coating composition with the substantially linear oligoester diol having the chain segments with the structures —CH$_2$—, —O—, —C(=O)—, —(R)CH— and —(R)$_2$C— (wherein R is methyl, ethyl propyl, isopropyl, isobutyl or normal butyl; or providing the branching index as aforesaid), which oligoester diol is within the molecular range and viscosity range as aforesaid with the oligoester also having a polydispersity index of not more than about 2.6 and preferably not more than 2.2 and preferably below about 1.8 and mixing the oligoester with the hardener and a crosslinker with the functionality and viscosity as aforesaid. Maintaining the substantial linearity of the oligoester, maintaining the polydispersity index of the oligoester and hardener and also providing a crosslinker which is miscible or soluble with the oligoester and hardener, and has the functionality and viscosity as aforesaid permits control of the viscosity of the coating composition which minimizes the use of organic solvents in a way and in an amount heretofore not previously known.

The formulated coating compositions are made by mixing the polymeric vehicle with pigments, catalysts and additives such as defoamers, pigment dispersants, anticrating agents and rheology modifiers. The formulated coating compositions have a viscosity of not more than about 1.2 Pa.s at about 50° C. at shear rates which may range from about 1 sec.$^{-1}$ to about 100,000 sec.$^{-1}$ depending upon the intended method of application. The formulated coating composition may be applied to a substrate by spraying (which has very high shear rates), dipping (which has a low shear rate such as about 1 sec.$^{-1}$), roll coating, brushing (which may have shear rates of from about 1000 to about 20,000 sec.$^{-1}$) or using other known application equipment and thereafter thermosetting the coating composition by the application of heat in the temperature range of from about 20° C. to about 300° C. for about 0.5 to about 60 minutes.

The following examples set forth compositions according to the invention and how to practice the method of the invention.

EXAMPLE I

The mesogenic diol having the formula

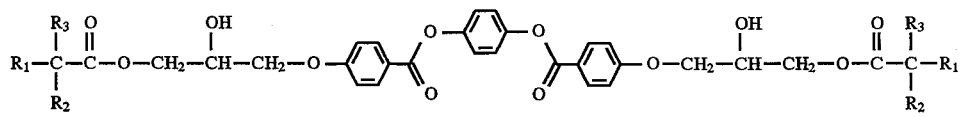

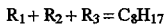

was made as follows.

In a 100 ml, 3-neck flask equipped with a magnetic stirrer, a condenser, a thermometer and a nitrogen gas inlet are placed 7.0 g (0.02 mol) of bis (4'-hydroxybenzoyl)1,4-dihydroxybenzene, 10.0 g (0.04 epoxy group equiv.) of glycidyl neodecanoate, 20 g of N-methyl pyrrolidone (NMP) and 0.085 g of Bu$_4$N$^{+Cl-}$. The flask is flushed with N$_2$ and heated to 160° C. slowly (about 1 hr.) and kept at this temperature for 2 hrs. After cooling, the solution of the product is poured into 30 mL of dichloromethane. The solution is washed with water three times in a separating funnel. The phases are separated and dicloromethane is removed with a rotary evaporator. The residue is dried under vacuum at 80° C. for 12 hrs. Yield is 15.3 g [90% based on bis (4'-hydroxybenzoyl) 1,4 hydroxybenzene] of resin. By gel permeation chromatography (GPC): M$_n$=1070, M$_w$=1390, PDI=1.3.

EXAMPLE II (a) Linear Adipates

Linear adipates having the general formula

HO—[(CH$_2$)$_n$—OCO—(CH$_2$)$_4$—OCO]$_2$—(CH$_2$)$_n$—OH n=6, 7, 8, 9 and 10 are made as follows via the following reaction

2 ClOC—(CH$_2$)$_4$—COCl+3HO(CH$_2$)$_n$—OH→HO—[(CH$_2$)$_n$—OCO—(CH$_2$)$_4$—OCO]$_2$—(CH$_2$)$_n$—OH.

A 100-mL three-neck, round-bottom flask is equipped with magnetic stirrer, thermometer, nitrogen capillary inlet and plastic tube. Adipoyl chloride (8.33 g, 2 mols), 7 diol (n in diol=7, 9.02 g, 3 mols) and pyridine (2.1 mols) are charged into the flask. The mixture is heated up to 70° C. and then kept this temperature for three hours. At the temperature of 70° C., nitrogen is bubbled through the melted mixture to blow out the hydrochloric acid. The hydrochloric acid (HCl) is liberated through a plastic tube into 100 mL of water. When the concentration of the solution is 0.09N, which determined by titration of 0.5N NaOH, then the reaction temperature is raised to 180° C. for another three hours. After reaction, the product is cooled to room temperature. A white, semi-solid paste is obtained. The product is washed with water three times and dried under vacuum. Yield of the product (7 diol-adipate) is 13.2 g (95%). The number average molecular weight M$_n$ is 1,744 and M$_w$ is 3,126.

The reaction of 10 diol with adipoyl chloride followed the same procedure as used for the 7 diol-adipate used. The difference is that the product is washed with water first and then washed with methanol.

The characteristics of the products were determined by IR, DSC and GPC.

The melting points were studied by capillary TempII-Laboratory Devices and DSC to investigate the transition process and thermal behavior.

TABLE 1

The melting points of adipates.

| Samples | 6 diol-adipate | 7 diol-adipate | 8 diol-adipate | 9 diol-adipate | 10 diol-adipate |
|---|---|---|---|---|---|
| TEMP II Melting Points | 120° C. | | 83° C.–85° C. | 64° C.–65.6° C. | 62° C.–68° C. |
| DSC Melting Points | | 38° C.–45° C. | | | |
| High Polymers M.P.* | 58° C. | | 67° C. | | 74° C. |

*The melting points of high polymers were from literature.

TABLE 2

Molecular weight distributions were measured by GPC and are as follows:

| | 7-diol-adipate | 10 diol-adipate |
|---|---|---|
| M$_n$ | 1744 | 2578 |
| M$_w$ | 3126 | 4532 |
| M$_w$/M$_n$ | 1.79 | 1.76 |

Viscosities were measured by both Hercules Hi-Shear viscometer and Brookfield low shear viscometer. The results are tabulated below.

TABLE 3

The viscosity of 7 diol-adipate at different shear rates ($s^{-1}$) and temperatures on Brookfield viscometer.

| Temperature | Viscosity (Pa · s) * at various shear rates | | | |
|---|---|---|---|---|
| (°C.) | 3.4 $s^{-1}$ | 6.8 $s^{-1}$ | 17 $s^{-1}$ | 34 $s^{-1}$ |
| 40 | 0.565 | 0.561 | 0.542 | |
| 60 | 0.231 | 0.228 | 0.224 | 0.222 |
| 80 | 0.113 | 0.112 | 0.110 | 0.109 |
| 100 | 0.066 | 0.068 | 0.064 | 0.062 |

* milli Pascal-sec.

Because the Brookfield viscometer can measure the viscosities only at the low shear rates, the viscosities also were measured on a Hercules Hi-Shear viscometer to investigate their rheological behavior at the high shear rates. The results are shown in Table 4.

TABLE 4

The viscosities of 7 diol-adipate vs. shear rates at various temperatures on Hercules Hi-Shear Viscometer.

| Shear Rate | Viscosity (Pa · s)$^a$ | | | | |
|---|---|---|---|---|---|
| (1/sec) | 50°–57° C.* | 60°–66° C. | 70°–74° C. | 80°–81° C. | 90°–91° C. |
| 7500 | 0.135 | 0.11 | 0.087 | 0.071 | 0.070 |
| 10000 | 0.132 | 0.108 | 0.086 | 0.069 | 0.068 |
| 12500 | 0.131 | 0.105 | 0.084 | 0.068 | 0.067 |
| 15000 | 0.127 | 0.104 | 0.083 | 0.066 | 0.066 |
| 20000 | 0.122 | 0.101 | 0.081 | 0.066 | 0.065 |
| 25000 | 0.115 | 0.099 | 0.078 | 0.065 | 0.064 |
| 30000 | 0.114 | 0.096 | 0.077 | 0.063 | 0.062 |
| 35000 | 0.113 | 0.095 | 0.077 | 0.063 | 0.062 |
| 40000 | 0.115 | 0.096 | 0.078 | 0.063 | 0.063 |
| 42069 | 0.117 | 0.098 | 0.078 | 0.064 | 0.064 |
| 40000 | 0.123 | 0.104 | 0.081 | 0.067 | 0.067 |
| 35000 | 0.14 | 0.116 | 0.089 | 0.071 | 0.071 |
| 30000 | 0.159 | 0.126 | 0.093 | 0.074 | 0.074 |
| 25000 | 0.18 | 0.136 | 0.1 | 0.077 | 0.077 |
| 20000 | 0.198 | 0.149 | 0.105 | 0.079 | 0.079 |
| 15000 | 0.218 | 0.156 | 0.108 | 0.082 | 0.082 |
| 12500 | 0.225 | 0.161 | 0.108 | 0.083 | 0.083 |
| 7500 | 0.235 | 0.165 | 0.11 | 0.083 | 0.083 |

$^a$milli Pascal-sec.
*Due to poor temperature control of the Hercules viscometer, the temperature of measurement is given as a range. In general, the temperature increased during the experiment.

The viscosities of the 10 diol-adipate were studied on a Hercules Hi-Shear viscometer. Results are shown in Table 5.

TABLE 5

The viscosities of 10 diol-adipate vs. temperatures and shear rates.

| Shear Rates (1/sec.) | * Viscosities (Pa · s) at 75–78° C. | Viscosities (Pa · s) at 85–87° C. | Viscosities (Pa · s) at 95–96° C. | Viscosities (Pa · s) at 105° C. |
|---|---|---|---|---|
| 7500 | 0.086 | 0.068 | 0.06 | 0.051 |
| 10000 | 0.084 | 0.068 | 0.059 | 0.0502 |
| 12500 | 0.083 | 0.067 | 0.059 | 0.05 |
| 15000 | 0.082 | 0.066 | 0.059 | 0.0495 |
| 20000 | 0.080 | 0.064 | 0.058 | 0.0492 |
| 25000 | 0.078 | 0.063 | 0.057 | 0.049 |

TABLE 5-continued

The viscosities of 10 diol-adipate vs. temperatures and shear rates.

| Shear Rates (1/sec.) | *Viscosities (Pa·s) at 75–78° C. | Viscosities (Pa·s) at 85–87° C. | Viscosities (Pa·s) at 95–96° C. | Viscosities (Pa·s) at 105° C. |
|---|---|---|---|---|
| 30000 | 0.077 | 0.063 | 0.056 | 0.049 |
| 35000 | 0.076 | 0.062 | 0.056 | 0.048 |
| 40000 | 0.077 | 0.063 | 0.056 | 0.049 |
| 42069 | 0.078 | 0.063 | 0.056 | 0.049 |
| 40000 | 0.081 | 0.066 | 0.058 | 0.05 |
| 35000 | 0.087 | 0.069 | 0.06 | 0.052 |
| 30000 | 0.093 | 0.072 | 0.062 | 0.054 |
| 25000 | 0.098 | 0.075 | 0.065 | 0.055 |
| 20000 | 0.102 | 0.077 | 0.067 | 0.056 |
| 15000 | 0.106 | 0.079 | 0.068 | 0.057 |
| 12500 | 0.107 | 0.079 | 0.068 | 0.058 |
| 7500 | 0.107 | 0.079 | 0.068 | 0.058 |

*milli Pascal-sec.

(b) Linear Azeleates Linear azeleates having the general formula

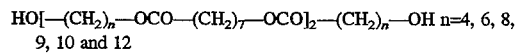
$HO[-(CH_2)_n-OCO-(CH_2)_7-OCO]_2-(CH_2)_n-OH$ n=4, 6, 8, 9, 10 and 12 are made as follows via the following reaction:

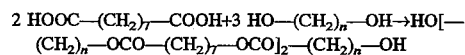
$2\ HOOC-(CH_2)_7-COOH + 3\ HO-(CH_2)_n-OH \rightarrow HO[-(CH_2)_n-OCO-(CH_2)_7-OCO]_2-(CH_2)_n-OH$ The method and equipment in this synthesis were the same as that used in synthesizing adipates. The procedure used is the same as that used for synthesis of 7 diol-adipate as described under (a).

Because acid chlorides are expensive for large scale synthesis, diacids are used to replace acid chlorides to obtain similar products with less cost. The reaction is indicated below.

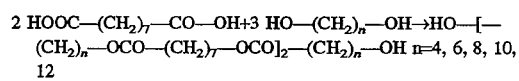
$2\ HOOC-(CH_2)_7-CO-OH + 3\ HO-(CH_2)_n-OH \rightarrow HO-[-(CH_2)_n-OCO-(CH_2)_7-OCO]_2-(CH_2)_n-OH$ n=4, 6, 8, 10, 12

A 500-mL three-neck, round-bottom flask is equipped with mechanical stirrer, Dean-Stark trap, condenser, thermometer and nitrogen inlet. Azelaic acid (95 g, 2 mols), 1,4-butanediol (68.23 g, 3 mols) and para toluene sulfonic acid are charged into the flask, and xylene (2% of total wt.) is used for reflux. The mixture is heated up to 160° C. (below the boiling points of diols). The temperature is held at 160° C. for five hours until 17 mL water is collected. Then the temperature is raised to 180° C. for one hour. When the acid value of 4 diol-azeleate is less than 10, the reaction is topped and a white semi-solid paste is obtained. Yield of this product (4 diol azeleate) is 155 g (95%). The acid number (A.V.):2. The molecular weight ($M_n$): 1508; $M_w$: 2528.

The reaction of other diols and azelaic acid follow the same procedure that 4 diol-azeleate used. The difference is the initial reaction temperature. In each case, the initial temperature is held at the temperature below the boiling points of diols.

The characteristic of these products was determined by IR, GPC, NMR and DSC.

The melting point of azeleates is as follows.

TABLE 6

The melting point of linear oligoester diols.

| Samples | 4 diol-azeleate | 6 diol-azeleate | 8 diol-azeleate | 10 diol-azeleate | 12 diol-azeleate |
|---|---|---|---|---|---|
| Melting Points | 30° C.–37° C. | 34° C.–56° C. | 34° C.–48° C. | 36° C.–55° C. | 34° C.–63° C. |

A comparison of the melting points of adipate and azeleate is shown in Table 7.

TABLE 7

The melting point of 7,4 and 4,7 diols.

| Samples | 4-diol-azeleate (B) | 4-diol-azeleate (A) | 7 diol-adipate from acid chloride |
|---|---|---|---|
| Melting Points | 30° C.–35° C. | 33° C.–35° C. | 35° C.–40° C. |

A: azeleate synthesized from diol and acid chloride.
B: azeleate synthesized from diol and diacid.

The molecular weight distributions of azeleates were as follows.

TABLE 8

| | 4 diol-azeleate | 6 diol-azeleate | 10 diol-azeleate |
|---|---|---|---|
| $M_n$ | 1508 | 2054 | 2864 |
| $M_w$ | 2528 | 3681 | 4751 |
| $M_w/M_n$ | 1.67 | 1.79 | 1.65 |

Azeleates

The viscosities of azeleates was also studied on Brookfield LVDV-II+. The results are tabulated below.

TABLE 9

The viscosity of 4 diol-azeleate at different shear rates ($s^{-1}$) and temperatures.

| Temp. (°C.) | Viscosity (Pa · s) * at various shear rates | | | |
|---|---|---|---|---|
| | $3.4\ s^{-1}$ | $6.8\ s^{-1}$ | $17\ s^{-1}$ | $34\ s^{-1}$ |
| 30 | 0.486 | 0.483 | 0.475 | |
| 40 | 0.297 | 0.289 | 0.282 | 0.272 |
| 50 | 0.171 | 0.171 | 0.169 | 0.167 |
| 83 | 0.054 | 0.053 | 0.052 | 0.051 |
| 104 | 0.03 | 0.029 | 0.029 | 0.029 |

* Pascal-seconds

When the viscosity in Table 9 was measured at 30° C., the 4 diol-azeleate was mostly liquid but contained an estimated 10% of suspended crystalline material.

TABLE 10

The viscosity of 6 diol-azeleate at a variety of temperatures and shear rates.

| Temp. (°C.) | Viscosity (Pa · s) * at various shear rates | | |
|---|---|---|---|
| | $1.7\ s^{-1}$ | $3.4\ s^{-1}$ | $6.8\ s^{-1}$ |
| 50 | 3.047 | | |
| 70 | 1.416 | 1.416 | |
| 80 | 0.966 | 0.960 | 0.951 |
| 100 | 0.594 | 0.564 | 0.546 |

* Pascal-seconds

TABLE 11

The viscosity of 8 diol-azeleate at different temperatures and shear rates.

| Temp. (°C.) | Viscosity (Pa · s) * at various shear rates | | | |
|---|---|---|---|---|
| | $3.4\ s^{-1}$ | $6.8\ s^{-1}$ | $17\ s^{-1}$ | $34\ s^{-1}$ |
| 50 | 0.192 | 0.191 | 0.185 | 0.182 |
| 60 | 0.165 | 0.159 | 0.148 | 0.136 |
| 80 | 0.069 | 0.063 | 0.061 | 0.059 |
| 100 | 0.039 | 0.038 | 0.037 | 0.036 |

* Pascal-seconds

TABLE 12

The viscosity of 10 diol-azeleate at different temperatures and shear rates.

| Temp. (°C.) | Viscosity (Pa · s) * at various shear rates | | | |
|---|---|---|---|---|
| | $3.4\ s^{-1}$ | $6.8\ s^{-1}$ | $17\ s^{-1}$ | $34\ s^{-1}$ |
| 60 | 0.192 | 0.185 | 0.178 | 0.174 |
| 80 | 0.086 | 0.084 | 0.083 | 0.083 |
| 100 | 0.05 | 0.048 | 0.047 | 0.046 |

* Pascal-seconds

TABLE 13

The viscosity of 12 diol-azeleate at various temperatures and shear rates.

| Temp. (°C.) | Viscosity (Pa · s) * at various shear rates | | | |
|---|---|---|---|---|
| | $3.4\ s^{-1}$ | $6.8\ s^{-1}$ | $17\ s^{-1}$ | $34\ s^{-1}$ |
| 60 | 0.435 | 0.415 | 0.405 | |
| 80 | 0.081 | 0.078 | 0.077 | 0.0762 |
| 100 | 0.045 | 0.042 | 0.0396 | 0.0393 |

* Pascal-seconds (c) Azeleates Containing a Trifunctional Polyol

For purposes of comparison with substantially linear oligomers, azeleates containing a trifunctional polyol based on trimethylolpropane (TMP) triol (C1) are made via the following reaction:

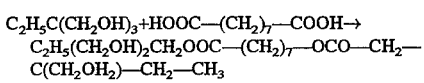

A 200-mL three-neck, round-bottom flask is equipped with mechanical stirrer, Dean-Stark trap, condenser, thermometer and nitrogen inlet. Azelaic acid (50 g, 1 mol), trimethylolpropane (TMP 68.56 g of 72.46 g, 2 mol) and boric acid (0.4% of total wt.) or p-TSA (0.2% of total wt.) are charged into the flask, and xylene (3% of total wt.) is used for reflux. The mixture is heated to 140° C. and held for six hours. When water that is collected in a Dean-Stark trap reaches 90% of the theoretical amount, the rest of the trimethylolpropane (4 g) is added to the flask and heating is continued for another two hours, then the reaction is stopped. A transparent viscous liquid is obtained. Yield of the product (C1) is 107 g (95%). Acid number (A.V.):5.

Azeleates containing a trifunctional polyol based on TMP triol and 1,4- butanediol (C2) are made via the following reaction:

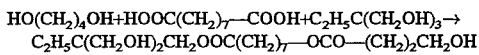

The reaction follows the same procedure that C1 used. Diol, azelaic acid, 90% of TMP, and boric acid or p-TSA were charged into the flask at the initial stage. After six hours, the rest of the 10% TMP is added into the flask. A transparent liquid is obtained. Yield of the product (C2) was 106 g (96%). A.V.:2.

Azeleates containing a trifunctional polyol (C1, C2) had the following molecular weight distribution.

| | C1 | C2 |
|---|---|---|
| $M_n$ | 1286 | 1509 |
| $M_w$ | 3101 | 3180 |
| $M_w/M_n$ | 2.41 | 2.11 |

TABLE 14

The viscosity of C1 at the different temperatures and shear rates.

| Shear Rates | Viscosity (Pa · s) * at different temperatures | | | |
|---|---|---|---|---|
| (1/s) | 80° C. | 90° C. | 100° C. | 150° C. |
| 0.4 | 0.749 | 0.709 | 0.509 | 0.409 |
| 2 | 0.509 | 0.309 | 0.216 | 0.124 |
| 4 | 0.464 | 0.287 | 0.184 | 0.066 |
| 7.9 | 0.451 | 0.267 | 0.171 | 0.045 |

* Pascal-seconds

TABLE 15

The viscosity of C2 at the different temperatures and shear rates.

| Shear Rates | Viscosity (Pa · s) * at different temperatures | | | |
|---|---|---|---|---|
| (1/s) | 27° C. | 35° C. | 40° C. | 50° C. |
| 0.9 | 1.704 | 0.972 | 0.719 | 0.44 |
| 1.7 | 1.65 | 0.948 | 0.696 | 0.391 |
| 3.4 | 1.64 | 0.939 | 0.687 | 0.384 |
| 6.8 | — | 0.916 | 0.685 | 0.384 |

* Pascal-seconds

It can be seen that these azeleates containing a trifunctional polyol have substantially higher viscosities than the linear azeleates and additives described above (compare Tables 3, 9–13 with Tables 14–15) at a given temperature. The molecular weights of the linear and branched oligomers are generally comparable.

EXAMPLE III

COATINGS (a) Materials

Linear oligoester diols (4 diol-azeleate and 7 diol-adipate) and azeteate containing a trifunctional polyol ($C_2$) described in Example II are used as components or as a reactive diluent in coating formulations.

Hexa(methyoxymethyl) melamine resin (Resimene 747), a fully methylolated, monomeric melamine resin in which hexakis (methoxymethyl) melamine is a representative structure and hexa(alkoxymethyl) melamine resin (Resimene 755), a methylolated and butylolated melamine resin in which hexakis (alkoxymethyl) melamine resin is a representative structure were obtained from Monsanto Chemical Company. The hexamethylene biuret resin (Desmodur N-3200), which is aliphatic polyisocyanates, was obtained from Miles Corporation. K-Flex 128® (K128) and K-Flex 188® (K188), which are proprietary diols were obtained from King Industries, Norwalk, Conn. K-Flex 188 has the structure K-Flex 128 also is a polyester made from a cyclohexyldiol, but it has a lower molecular weight than K-Flex 188. Surface additives, BYK 341 and BYK 701 were obtained from BYK Chemie. Polyester resin 5778 (PS 5778) was obtained from Cargill, Inc. p-Toluenesulfonic acid monohydrate (p-TSA) and methylethyl-ketone (MEK) were obtained from Aldrich Chemical Company. All the materials were used as received.

First, all the diols or polyols are charged into small glass bottles, then, the diol mixtures are heated up to 50° C. or 60° C. (depending on the transition temperatures of diols) until they became homogeneous. The diol mixtures are well stirred in the homogeneous state. An amino resin (R747 or R755) is added into the polyol mixtures that had already cooled to room temperature. The catalyst, p-TSA, is first dissolved into small amount (about 0.5 ml) of acetone, and then is added into a well-mixed coating mixture. After the catalyst is added, the formulations are well stirred again.

The surface of each untreated steel Q-panel is cleaned with acetone or xylene three times.

Coatings are prepared by drawing down on untreated steel Q-panels with a #30 wire-wrapped, draw-down bar. Coatings applied are preheated in the temperature range from 40° C. to 60° C., meanwhile, steel panels and draw-down bar also are preheated to about 40° C. or 50° C. Then the coated panels are baked in 150° C. oven for 30 minutes. Dry film thickness was 25±5 um.

Viscosities are measured on a Brookfield LVDVII+ viscometer equipped with thermal cells. Samples measured included polyol, crosslinker and catalyst.

The film properties are tested between two hours and three days after crosslinking. Pencil hardness, reverse impact and forward impact resistance were measured according to ASTM D3363, D2794. During the impact resistance test, coating films did not have any initially failure, however, films displayed failures at the test spots three days after the tests. MEK resistance is tested by a piece of Kim-wipe paper saturated with MEK solvent and is recorded as the number of double rubs. The appearance of the film is determined by visual evaluation. Film thickness is measured by a magnetic coating thickness gauge (Mikrotest). Except for formulations 2 and 4, the following formulated coating compositions are made to show that films in accordance with the invention are harder and tougher. Formulations 2 and 4 are not in accordance with the invention, but are for comparative purposes.

(b) Coating Formulation

| | Parts |
|---|---|
| Formulation 1. (Film cast at 50° C.) | |
| 4,7(7 diol) Adipate of Example IIa | 70 |
| Resimene-747 | 30 |
| P-TSA | 0.5 |
| Surface additive (BYK-341) | 0.1 |
| Solvent | None |
| Properties of Formulation 1 | |
| Viscosity at 40° C. | 0.4 Pa · s |
| Thickness | 25 μm |

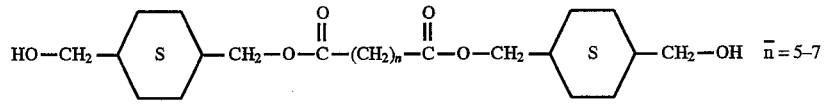

-continued

| | Parts |
|---|---|
| Forward Impact Resistance | 140 in-lb |
| Reverse Impact Resistance | 80 in-lb |
| Pencil Hardness | H-HB |
| MEK Resistance | >200 rubs |
| Solid content (110° C., 30 min.) | 97% |
| Appearance | transparency, gloss |

Formulation 2. (Film must be cast at 40° C. to 50° C.)

| | |
|---|---|
| 4,7(7 diol) Adipate of Example IIa | 20 |
| 3-Ring mesogenic oligomer of Example I | 50 |
| Resimene-747 | 30 |
| P-TSA | 0.5 |
| Surface additive (BYK-341) | 0.4 |
| Solvent | None |

Properties of Formulation 2.

| | |
|---|---|
| Viscosity at 40° C. | 0.8 Pa · s |
| Thickness | 2 5 μm |
| Forward Impact Resistance | 160 in-lb |
| Reverse Impact Resistance | 160 in-lb |
| Pencil Hardness | 4H–3H |
| MEK Resistance | >200 |
| Solid content (100° C., 30 min.) | 95% |
| Appearance | transparency, gloss |

Formulation 3. (Film cast at 30° C.)

| | |
|---|---|
| 7,4 Azeleate of Example IIb | 20 |
| 3-Ring mesogenic oligomer of Example I | 50 |
| Resimene-747 | 30 |
| P-TSA | 0.5 |
| Surface additive (BYK-341) | 0.4 |
| Solvent | None |

Properties of Formulation 3.

| | |
|---|---|
| Viscosity at 40° C. | 0.8 Pa · s |
| Thickness | 25 μm |
| Forward Impact Resistance | 160 in-lb |
| Reverse Impact Resistance | 160 in-lb |
| Pencil Hardness | 4H–3H |
| MEK Resistance | >200 rubs |
| Solid content (110° C., 30 min.) | 95% |
| Appearance | transparency, gloss |

Formulation 4. (Film cast at room temperature)

| | |
|---|---|
| Azeleate of Example IIc | 70 |
| Resimene-747 | 30 |
| P-TSA | 0.5 |
| Surface additive (BYK-341) | 0.1 |
| Solvent | None |

Properties of Formulation 4.

| | |
|---|---|
| Viscosity at 27° C. | 1.35 Pa · s |
| Thickness | 25 μm |
| Forward Impact Resistance | 120 in-lb |
| Reverse Impact Resistance | 60 in-lb |
| Pencil Hardness | 4H |
| MEK Resistance | >200 rubs |
| Solid content (110° C., 30 min.) | 95% |
| Appearance | transparency, gloss |

Formulation 5. (Film cast at 30° C. or 40° C.)

| | |
|---|---|
| Azeleate of Example IIc | 50 |
| 3-Ring mesogenic oligomer of Example I | 20 |
| Resimene-147 | 30 |
| P-TSA | 0.5 |
| Surface additive (BYK-341) | 0.4 |
| Solvent | None |

Properties of Formulation 5.

| | |
|---|---|
| Viscosity at 40° C. | 1 Pa · s |
| Thickness | 2 5 μm |
| Forward Impact Resistance | 140 in-lb |
| Reverse Impact Resistance | 80 in-lb |
| Pencil Hardness | 4H |
| MEK Resistance | >200 rubs |
| Solid content (110° C., 30 min.) | 95% |
| Appearance | transparency, gloss |

(c) Coating Formulations with 1,3,5-Tris (2-hydroxyl ethyl) cyanuric acid (THECA)

4-Diol azeleate (4DA) ($M_n$=695) (30 g) is placed in a 100-mL beaker and heated to 150° C. on a hotplate. THECA (6 g) is placed in another 100-mL beaker and heated at 150° C. in an oven until it melts, then it is poured into hot liquid 4DA under fast magnetic stirring. The mixture is cooled down to room temperature under magnetic stirring. Melamine resins Resimene 755 or 797 were added at a ratio of 65/35 (4DA/melamine). The mixture was then stirred for 40 hours. Resimene 797 is methylolated melamine formaldehyde resin having as its principal reactive group —N—$(CH_2OCH_3)_2$. It contains 20 weight % of a polyol additive. It totals 92% solids-weight.

TABLE 16

Film properties of coatings made from 4-diolazeleate ($M_n$ = 695) with THECA.

| Formulation No. | 1 | 2 | 3 |
|---|---|---|---|
| Resimene 755 % | 35 | 35 | 35 |
| (4DA/THECA = 4/1) % | 65 | 65 | 65 |
| p-TSA % | 1.0 | 1.0 | 1.0 |
| Dispersion time in hours | 3 | 40 | 40 |
| Viscosity mPa · s at 25° C. | 620 | 950 | — |
| 2-n-butoxy ethanol | NO | NO | 10% of wt. of solids weight |
| Baking temp. for 30 minutes | 150° C. | 150° C. | 150° C. |
| Pencil Hardness | HB | 2H | 2H–3H |
| Adhesion | 0B | 1B | 2B |
| Direct impact lb-in. | 40 | 60 | 60 |
| Film appearance | rough surface | good | good |

The effect of catalyst dinonylnaphthalene disulfonic acid (DNNDSA)

Two formulations were made with 12.5% THECA using DNNDSA as a catalyst. DNNDSA is a liquid and is easy to mix into the resin. The properties are listed in Table 17. It was found that the use of DNNDSA improved glass and leveling and that, when formulated with Resimene 797, the coating film had the best improvement in film properties, the hardness was 2H–3H and adhesion was 3B on untreated panels.

TABLE 17

Film properties of coatings made from 4-diolazeleate ($M_n$ = 695) with THECA using DNNDSA as catalyst.

| | | |
|---|---|---|
| THECA % | 12.5 | 12.5 |
| 4DA % | 50 | 50 |
| Resimene 755 & 797 % | 37.5 | 37.5 |
| | (755) | (797) |
| DNNDSA % | 1.0 | 1.0 |
| Baking temp./30 minutes | 150° C. | 138° C. |
| Hardness | 2H | 2H–3H |
| Adhesion on untreated steel panel | 0B–1B | 3B |
| Adhesion on primed steel panel | 5B | 5B |

EXAMPLE IV (a) Formulation of 4-diol azeleate ($M_n$=695) with the hardener 6GT

4-Diol azeleate (DA) ($M_n$=695) (30 g) is placed in a 100-mL beaker and heated on a hotplate to 20° C. 6GT (6-glycol-terephthalate, 3 g) is placed in an aluminum dish and heated at 130° C. in an oven until it melts, then it is poured into liquid 4DA. The mixture is cooled down to room temperature under magnetic stirring. Melamine resins 755 or 797 are added at ratio of 65/35 (4DA/melamine). The mixture is then stirred for 2 hours.

TABLE 18

Properties of coatings made from 4-diol azeleate ($M_n = 695$) with 10% of 6GT.

| | |
|---|---|
| (4DA/6GT = 10/1, % | 60 |
| Resimene 755, % | 40 |
| p-TSA % of wt. of total solids | 1.0 |
| Viscosity mPa · s * (40 hr. stirring) at 25° C. RPM = 50 spindle #64 | 1800 |
| Direct impact in.-lb. | 60 |
| Pencil hardness | HB |
| Solvent resistance | >200 |
| Adhesion | 0B |

* milli Pascal-sec.

TABLE 19

Viscosity of 4-diol azeleate ($M_n = 695$) with 10% 6GT using diffeyent shear rate at 25° C.

| Shear Rate RPM | 100 | 50 | 20 | 10 | 5 | 2.5 | 1.0 |
|---|---|---|---|---|---|---|---|
| mPa · s | 1442 | 1782 | 2269 | 3899 | 5879 | 94599 | 18600 |

* milli Pascal-sec.
Spindle LV #64.

EXAMPLE V (a) Formulation of 4-diol azeleate ($M_n=550$) with the hardener D-sorbitol.

A saturated solution of D-sorbitol in water (10% by weight of D-sorbitol) was added into the resin (Oligomer/797=65/35) under stirring. The D-sorbitol was not dispersed and together with water formed a fluffy suspension in the solution.

TABLE 20

Properties of coatings made from 4DA ($M_n = 550$) with D-Sorbitol.

| | |
|---|---|
| D-sorbitol % (dissolved in water) | 6.5 (wt of D-sorbitol) |
| 4ADA % | 58.5 |
| Resimene 797 % | 35 |
| p-TSA % | 1.6 |
| Baking temperature/30 min. | 138° C. |
| Pencil. hardness | 2H |
| Adhesion | 4B |
| Film appearance | yellow, transparent |

EXAMPLE VI

Synthesis of an oligoester diol which is the reaction product of 1,4-butane-diol and a mixture of dimethyl esters of $HOOC(CH_2)_nCOOH$ diacids, n=3, 4 and 7 in a 1:1:1 molar ratio (Mn=520).

The materials used for the synthesis of oligoester diols were as follows. Dimethyl azelate was obtained from Aldrich and redistilled, the distilled diester was composed of dimethyl esters of heptanedioic (1.8%), octanedioic (4.1%), azelaic (83.6%), decanedioic (3.5%) and undecanedioic (7.1%) acids, as determined by GC/MS. Dimethyl glutarate and dimethyl adipate were obtained from Du Pont, as "DBE-5" and "DBE-3", respectively, they are reported to be mixtures of the dimethyl esters of succinic (SA), glutaric (GA), and adipic (AA) acids in the following proportions:

DBE-3: SA, <1%; GA, 5–15%; AA, 85–95%;

DBE-5: dimethyl glutarate >98.5%.

DBE-3 and DBE-5 are liquids at 25° C. and solids at 0° C. 1,4-butanediol (99%) and zinc acetate dihydrate (98%) were obtained from Aldrich Chemical Co.

In a 500-ml four-neck flask equipped with stirrer, Dean-Stark trap, condenser, thermometer and nitrogen inlet, were placed dimethyl azelate (108 g., 0.5 mol), DBE-3 (87 g., 0.5 mol), DBE-5 (80 g., 0.5 mol), 1,4-butanediol (270 g., 3.0 mol), zinc acetate dihydrate (1.09 g., 0.2% of total reactant weight). The stirred mixture was heated by an electrothermal heating mantle with a controller from 150° C. to 170° C. for 3 hours, and then heated to 200° C. and maintained for 1 hour. About 95% of the theoretical amount of methanol, the by-product of the transesterification, was collected in the Dean-Stark trap. The temperature was raised from 200° C. to 220° C., and nitrogen was fed slowly through the reactants to remove 1,4-butanediol, the by-product of the co-polycondensation. Oligoester-diols with different molecular weights were obtained by removing samples at different intervals.

The oligoester diol ($M_n=520$) was mixed with a hardener and crosslinker as described below.

(a) Formulations of oligoester diol of VI with hardener 6GT
*

TABLE 21

| Oligoester-diol ($M_n$ 520) | VI (a) | VI (a) | VI (a) |
|---|---|---|---|
| Wt/ | 4.9 g | as left | as left |
| Hardener | 6GT | " | " |
| % of Diol. | 20% | " | " |
| Cymel 1135 (% of Diol) | 66% | " | " |
| Solspense 24000** | 1% | " | " |
| Luxate XHD 0700 (% of Diol) | — | 10% | " |
| Solvent (MEK)** | — | — | 5% |
| BYK-077 (Defoamer)** | 0.5 | " | " |
| DNNDSA** | 1% | 1% | 1% |
| Panel | *** | as left | as left |
| | Q-PHOS R-36-1 | | |
| Film thickness (mil) | 0.9–1.0 | 0.9–1.0 | 0.8–0.9 |
| Direct Impact (lb-in) | >120 | >120 | >120 |
| Reverse Impact (lb-in) | <80, –40 | –80, >40 | <80, >40 |
| Pencil Hardness | 1H–2H | 2H | 1H–2H |
| MEK Rub Resistance | >200 | >200 | >200 |
| Adhesion | 1B–2B | 3B–4B | 3B–4B |
| Appearance | Transparent | Transparent | Transparent |

*6-glycol-terephthalate
**Percentage of the total weight
***Q-PHOS is a mark under which phosphated steel panels are sold. These panels were used in the tests described herein.

(b) Formulations of oligoester diol of Example VI with hardener 10GT.

10 GT is

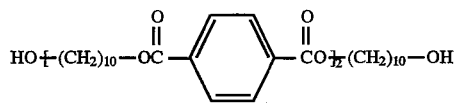

TABLE 22

| Oligoester-diol (M_n 520) | VI | VI | VI |
|---|---|---|---|
| Wt/ | 4.9 g | as left | as left |
| Hardener | 10GT | " | " |
| % of Diol. | 25% | " | " |
| Cymel 1135 (% of Diol) | 66% | " | " |
| Solspense 24000* | 1% | " | " |
| Luxate XHD 0700 (% of Diol) | — | 10% | " |
| Solvent (MEK)* | — | — | 5% |
| BYK-077 (Defoamer)* | 0.5% | 0.5% | 0.5% |
| DNNDSA*a | 1% | 1% | 1% |
| Panel | Q-PHOS R-36-1 | as left | as left |
| Film thickness (mil) | 0.8–0.9 | 1.0–1.1 | 0.8 |
| Direct Impact (lb-in) | >120 | >120 | >120 |
| Reverse Impact (lb-in) | <80, –40 | >80, >40 | <80, >40 |
| Pencil Hardness | 1H–2H | 2H | 1H–2H |
| MEK Rub Resistance | >200 | >200 | >200 |
| Adhesion | 1B–2B | 3B–4B | 3B–4B |
| Appearance | Transparent | Transparent | Transparent |

*Percentage of the total weight.
aDinonylnaphthalene disulfonic acid.

(c) Formulations of oligoester diol of Example VI with hardener THECA.

TABLE 23

| Oligoester-diol (M_n 520) | VI (a) | VI (a) | VI (a) |
|---|---|---|---|
| Wt/ | 4.8 g | " | " |
| Hardener | THECA | " | " |
| % of Diol. | 20% | " | " |
| Cymel 1135 (% of Diol) | 66% | " | " |
| Solspense 24000* | 1% | " | " |
| Luxate XHD 0700 (% of Diol) | — | 10% | " |
| Solvent (MEK)* | — | — | 5% |
| BYK-077 (Defoamer)* | 0.5% | 0.5% | 0.5% |
| DNNDSA*a | 1% | 1% | 1% |
| Panel | Q-PHOS R-36-1 | as left | as left |
| Film thickness (mil) | 0.7–0.8 | 0.8–0.9 | 0.8 |
| Direct Impact (lb-in) | ~120 | >120 | >120 |
| Reverse Impact (lb-in) | <60 | ~60 | ~60 |
| Pencil Hardness | 5H | 5H | 5H |
| MEK Rub Resistance | >200 | >200 | >200 |
| Adhesion | 5B | 5B | 5B |
| Appearance | Transparent | Transparent | Transparent |

*Percentage of the total weight.
aDinonylnapthalene disulfonic acid.

What is claimed is:

1. A polymeric vehicle which is effective for providing a formulated coating composition having at least about 75 weight % solids, the polymeric vehicle comprising:

at least one nonmesogenic substantially linear oligoester diol having a number average molecular weight in the range of from about 275 to about 3000 and a polydispersity index of not more than about 2.6;

at least one hardener selected from the group consisting of a mesogenic polyol, a crystalline polyol and mixtures thereof; and an least one crosslinker which is reactive with the substantially linear oligoester diol and hardener, the mesogenic polyol having a number average molecular weight in the range of from about 186 to about 4000, a polydispersity index of not more than about 2.6 and comprising from about 5 to about 50 weight percent mesogens, based upon the weight of the mesogenic polyol, wherein the mesogenic polyol has mesogenic groups selected from the group consisting of formulas I, II and III, wherein

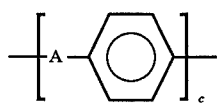   I or covalently bonded combinations of general formula I;

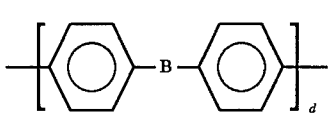   II or covalently bonded combinations of general formula II;

and combinations of Formulas I and II,

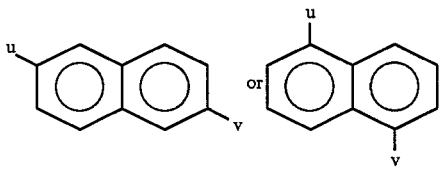   III or covalent combinations of general formula III;

wherein

A is selected from the group consisting of

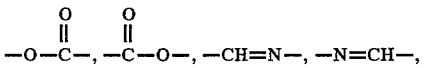

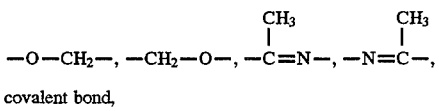

covalent bond,

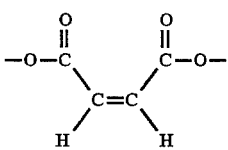

and

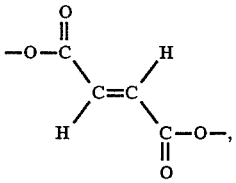

B is selected from the group consisting of

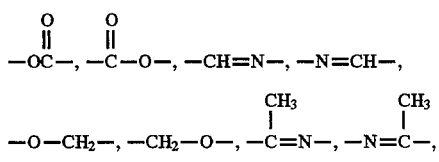

covalent bond,

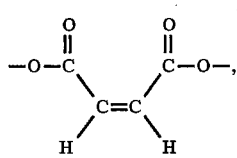

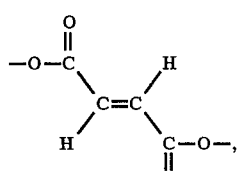

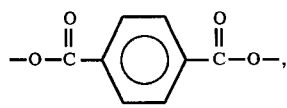

or

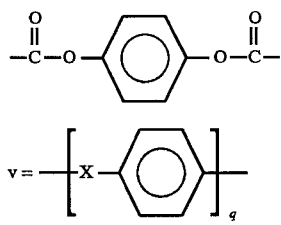

wherein
c=an integer from 2 to 8;
d=1 or 2;
u=A;
x=A; and
q=integer from 1 to 3,
the crystalline polyol being oligomeric or nonoligomeric and having from 5 to about 200 carbon atoms, the oligomeric crystalline polyol having a number average molecular weight in the range of from about 400 to about 4000, the nonoligomeric polyol having a molecular weight in the range of from 120 to about 500, and a solubility in the formulated coating composition of not more than 10 g/L at a temperature range of from about 0° C. to about 40° C.,
the oligoester diol, hardener and crosslinker being in a ratio effective to provide a mixture of the oligoester diol, the hardener and crosslinker with a viscosity in the range of from about 0.1 to about 20 Pa.s at from about 20° C. to about 60° C. at a shear rate of about 1000 seconds$^{-1}$.

2. A formulated coating composition having at least about 75 weight % solids, the formulated coating composition comprising:
a polymeric vehicle and an organic solvent,
the polymeric vehicle comprising
at least one nonmesogenic substantially linear oligoester diol having a number average molecular weight in the range of from about 275 to about 3000 and a polydispersity index of not more than about 2.6,
at least one hardener selected from the group consisting of a mesogenic polyol, a crystalline polyol and mixtures thereof, and
a crosslinker which is reactive with the substantially linear oligoester diol and hardener,
the mesogenic polyol having a number average molecular weight in the range of from about 186 to about 4000 and a polydispersity index of not more than 2.6 if it is dispersed in the formulated coating composition and a number average molecular weight of from about 186 to 1000 and a polydispersity index of not more than about 2.6 if it is a solution in the formulated coating composition, and the mesogenic polyol comprising from about 10 to about 50 weight percent mesogens, based upon the weight of the mesogenic polyol, if it is in solution in the formulated coating composition and comprising from about 5 to about 50 weight percent mesogens, based upon the weight of the mesogenic polyol, if it is dispersed in the formulated coating composition, wherein the mesogenic polyol has mesogenic groups selected from the group consisting of formulas I, II, and III wherein

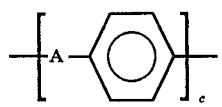

or covalently bonded combinations of general formula I;

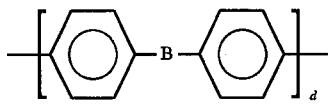

or covalently bonded combinations of general formula II; and combinations of formulae I and II, and

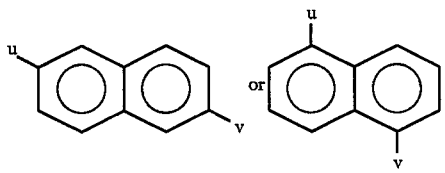

or covalent combinations of general formula III; wherein
A is selected from the group consisting of

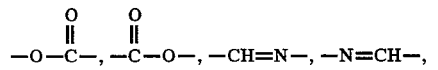

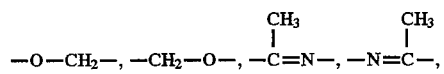

covalent bond,

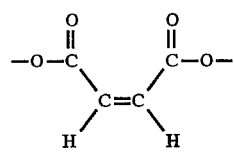

and

-continued

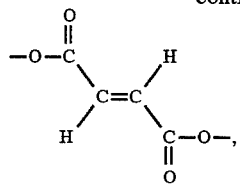

B is selected from the group consisting of

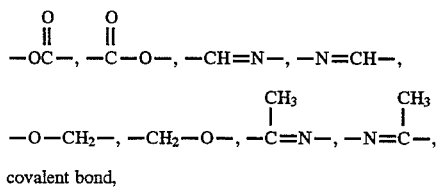

covalent bond,

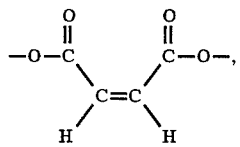

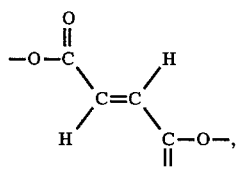

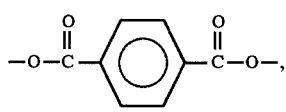

or

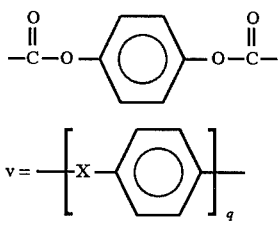

wherein
c=an integer from 2 to 8;
d=1 or 2;
U=A;
x=A; and
q=integer from 1 to 3,
the crystalline polyol being oligomeric or nonoligomeric and having from 5 to about 200 carbon atoms, the oligomeric crystalline polyol having a number average molecular weight in the range of from about 400 to about 4000, the nonoligomeric polyol having a molecular weight in the range of from 120 to about 500, and a solubility in the formulated coating composition of not more than 10 g/L at a temperature range of from about 0° C. to about 40° C.,
the oligoester diol, hardener and crosslinker being in a ratio effective to provide a mixture of the oligoester diol, the hardener and crosslinker with a viscosity in the range of from about 0.1 to about 20 Pa.s at from about 20° C. to about 60° C. at a shear rate of about 1000 seconds$^{-1}$.

3. A polymeric vehicle comprising:
a blend of a nonmesogenic substantially linear oligoester diol having a number average molecular weight in the range of from about 275 to about 3000 and a polydispersity index of not more than about 2.6 and a hardener selected from the group consisting of a mesogenic polyol, a crystalline polyol and mixtures thereof, the blend effective for crosslinking through a crosslinker which is reactive with the substantially linear oligoester diol and hardener, the mesogenic polyol having a number average molecular weight in the range of from about 186 to about 4000, a polydispersity index of not more than about 2.6 and comprising from about 5 to about 50 weight percent mesogens, based upon the weight of the mesogenic polyol, the mesogenic polyol has mesogenic groups selected from the group consisting of formulas I, II, and III, wherein

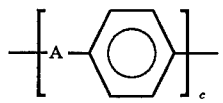 I or covalently bonded combinations of general formula I;

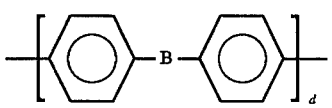 II or covalently bonded combinations of general formula II;
and combinations of formulas I, II and

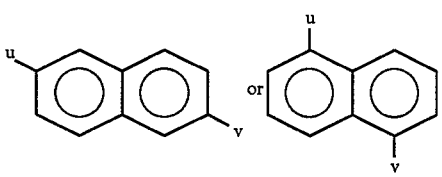 III or covalent combinations of general formula III;
wherein
A is selected from the group consisting of

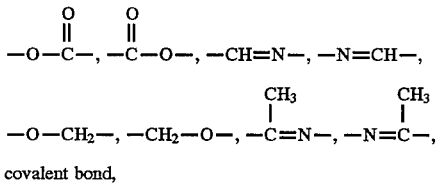

covalent bond,

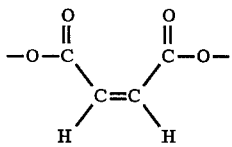

and

-continued

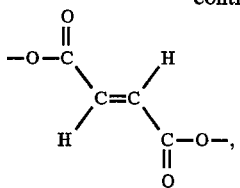

B is selected from the group consisting of

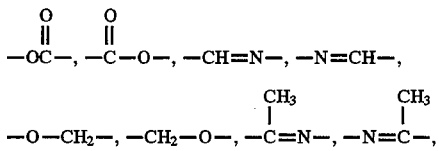

covalent bond,

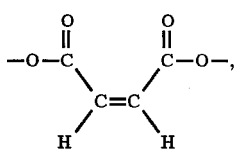

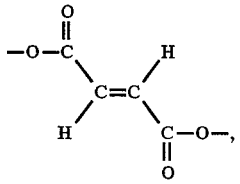

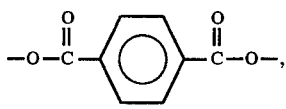

or

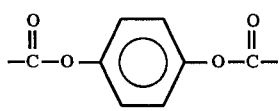

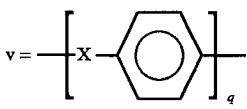

wherein
c=an integer from 2 to 8;
d=1 or 2;
x=A; and
q=integer from 1 to 3,
the crystalline polyol being oligomeric or nonoligomeric and having from 5 to about 200 carbon atoms, the oligomeric crystalline polyol having a number average molecular weight in the range of from about 400 to about 4000, the nonoligomeric polyol having a molecular weight in the range of from 120 to about 500, and a solubility in the formulated coating composition of not more than 10 g/L at a temperature range of from about 0° C. to about 40° C.,
the oligoester diol and the hardener being in a ratio effective to provide a mixture comprising the oligoester diol, the hardener and a crosslinker with a viscosity in the range of from about 0.1 to about 20 Pa.s at from about 20° C. to about 60° C. at a shear rate of about 1000 seconds$^{-1}$.

4. A polymeric vehicle comprising:
a blend of a nonmesogenic substantially linear oligoester diol having a number average molecular weight in the range of from about 275 to about 3000 and a polydispersity index of not more than about 2.6, wherein the oligoester diol is terminated with hydroxyl groups and has a longitudinal chain having chain segments with the structures selected from the group consisting of —CH$_2$—, —O—, —C(=O)—, —(R)CH—, —(R)$_2$C— wherein R is selected from the group consisting of methyl, ethyl, propyl, isopropyl, normal butyl and isobutyl and not more than 8 percent of the number of hydrogens which would be bonded to carbon atoms along the longitudinal chain are substituted with R, wherein the main longitudinal chain is terminated with hydroxyl group or R is substituted with hydroxyl group if R is not more than four carbons of a terminal carbon of the longitudinal chain, and a hardener selected from the group consisting of a mesogenic polyol, a crystalline polyol and mixtures thereof, the blend effective for crosslinking through a crosslinker which is reactive with the substantially linear oligoester diol and hardener, the mesogenic polyol having a number average molecular weight in the range of from about 186 to about 4000, a polydispersity index of not more than about 2.6 and comprising from about 5 to about 50 weight percent mesogens, based upon the weight of the mesogenic polyol, the mesogenic polyol has mesogenic groups selected from the group consisting of formulas I, II, and III, wherein

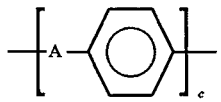 I or covalently bonded combinations of general formula I;

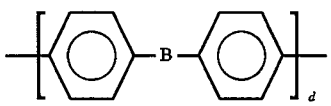 II or covalently bonded combinations of general formula II; and combinations of formulas I, II and

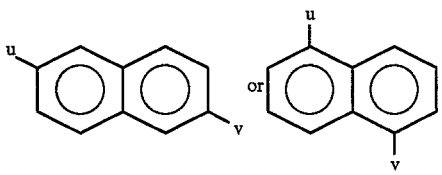 III or covalent combinations of general formula III;
wherein
A is selected from the group consisting of

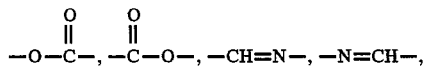

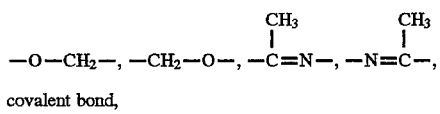

covalent bond,

-continued

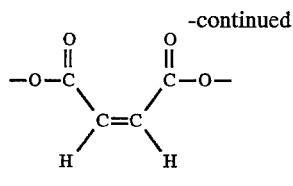

and

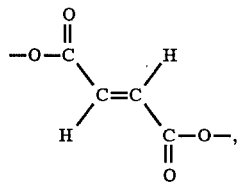

B is selected from the group consisting of

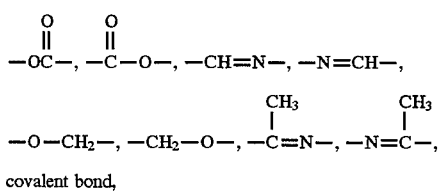

covalent bond,

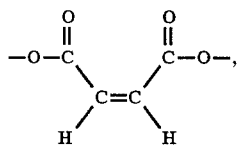

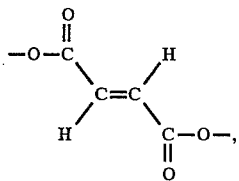

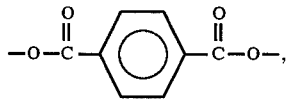

or $$-\overset{O}{\underset{\|}{C}}-O-\underset{}{\bigcirc}-O-\overset{O}{\underset{\|}{C}}-$$

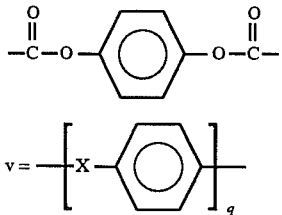

wherein c=an integer from 2 to 8;
d=1 or 2;
u=A;
x=A; and
q=integer from 1 to 3,
the crystalline polyol being oligomeric or nonoligomeric and having from 5 to about 200 carbon atoms, the oligomeric crystalline polyol having a number average molecular weight in the range of from about 400 to about 4000, the nonoligomeric polyol having a molecular weight in the range of from 120 to about 500, and a solubility in the formulated coating composition of not more than 10 g/L at a temperature range of from about 0° C. to about 40° C.,
the oligoester diol and the hardener being in a ratio effective to provide a mixture comprising the oligoester diol, the hardener and a crosslinker with a viscosity in the range of from about 0.1 to about 20 Pa.s at from about 20° C. to about 60° C. at a shear rate of about 1000 seconds$^{-1}$.

5. A polymeric vehicle as recited in claim 4 wherein the hardener is the mesogenic polyol and is effective for forming a dispersion in the formulated coating composition.

6. A polymeric vehicle as recited in claim 4 wherein the hardener is the mesogenic polyol, the mesogenic polyol has a number average molecular weight in the range of from about 186 to about 1000 and is effective for forming a solution in the formulated coating composition.

7. A polymeric vehicle as recited in claim 4 wherein the crosslinker has an average functionality which is reactive with the hydroxyls of the oligoester diol and hardener which average functionality is more than about 2.4.

8. A polymeric vehicle as recited in claim 4 wherein the crystalline polyol consists essentially of atoms selected from the group consisting of carbon, hydrogen, oxygen and nitrogen atoms, the nitrogen atom forming a part of a nitrogen group selected from the group consisting of an amide group, an urea group and an amidine group.

9. A polymeric vehicle as recited in claim 1 wherein the oligoester diol is terminated with hydroxyl groups and has a longitudinal chain having chain segments with the structures selected from the group consisting of —CH$_2$—, —O—, —C(=O)—, —(R)CH—, —(R)$_2$C— wherein R is selected from the group consisting of methyl, ethyl, propyl, isopropyl, isobutyl and normal butyl and not more than about 8 percent of the number of hydrogens which would be bonded to carbon atoms along the longitudinal chain are substituted with R or R is substituted with hydroxyl group if R is not more than four carbons from a terminal carbon of the longitudinal chain.

10. A polymeric vehicle as recited in claims 1 or 9 wherein the polymeric vehicle comprises from about 15 to about 50 weight percent oligoester diol, from about 10 to about 50 weight percent hardener and from about 10 to about 40 weight percent crosslinker.

11. A polymeric vehicle as recited in claim 1 wherein the crystalline polyol consists essentially of atoms selected from the group consisting of carbon, hydrogen, oxygen and nitrogen atoms, the nitrogen atom forming a part of a nitrogen group selected from the group consisting of an amide group, an urea group and an amidine group.

12. A polymeric vehicle as recited in claims 1, 9 or 11 wherein the substantially linear oligoester polyol has a branching index of not more than about 0.12 wherein the branching index is defined by the formula $$\text{branching index} = \frac{(C_s + 2C_d) B_1}{C_1 + C_s + 2C_d} ;$$

Where $C_1$=the average number of linear segments per oligomer molecule;

$C_s$=the average number of segments with single branches per molecule;

$C_d$=the average number of segments with double branches per molecule;

$B_1$=the average length, in carbon and oxygen atoms, of branches.

13. A polymeric vehicle as recited in claims 1, 9 or 11 wherein the crystalline polyol has a melting point of from about 5° C. to about 40° C. below a baking temperature which ranges from about 70° to about 175° C.

14. A polymeric vehicle as recited in claim 1 wherein the oligoester diol has the general formula $$HO(CH_2)_m\text{—}[OOC(CH_2)_nCOO(CH_2)_m]_pO\text{—}H$$

wherein $p<1$ and $<6$, $m=2$ to 16, $n=0$ to 12.

15. A polymeric vehicle as recited in claims 1 or 9 wherein the mesogenic polyol has the general formula $$R_o\text{-F-E-F-}R_o$$

wherein

E is selected from the group consisting of

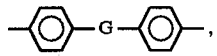,

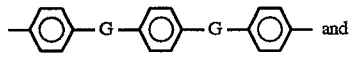 and

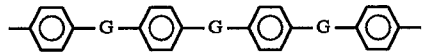

G is selected from the group consisting of —COO—, —OOC—, —CH$_2$O—, —OCH$_2$—,

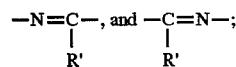

wherein

R' is selected from the group consisting of —CH$_3$ and H;

F is selected from the group consisting of —O—, —COO— and —OOC—; $R_o$ is an aliphatic group having from 4 to 30 carbons and at least one hydroxyl group; and wherein any hydroxyl group included in $R_o$ is spaced from F by at least one carbon atom.

16. A polymeric vehicle as recited in claim 15 wherein $R_o$ is an adduct of a monoxirane having not more than about 25 carbon atoms.

17. A polymeric vehicle as recited in claims 1 or 9 wherein he hardener is the mesogenic polyol and is effective for forming a dispersion in the formulated coating composition.

18. A polymeric vehicle as recited in claims 1 or 9 wherein the hardener is the mesogenic polyol, the mesogenic polyol has a number average molecular weight in the range of from about 186 to about 1000 and is effective for forming a solution in the formulated coating composition.

19. A polymeric vehicle as recited in claims 1, 9 or 11 wherein the crosslinker has an average functionality which is reactive with the hydroxyls of the oligoester diol and hardener which average functionality is more than about 2.4.

20. A polymeric vehicle as recited in claim 10 wherein the crystalline polyol consists essentially of atoms selected from the group consisting of carbon, hydrogen, oxygen and nitrogen atoms, the nitrogen atom forming a part of a nitrogen group selected from the group consisting of an amide group, an urea group and an amidine group.

21. A polymeric vehicle as recited in claim 10 wherein the crystalline polyol has a melting point of from about 5° C. to about 40° C. below a baking temperature which ranges from about 70° to about 175° C.

22. A formulated coating composition as recited in claim 2 wherein the oligoester diol, the hardener and the crosslinker are in a ratio effective to provide the coating binder having a pencil hardness of at least about B when applied to a substrate at a thickness of about 1 mil dry.

23. A formulated coating composition as recited in claim 2 wherein the oligoester diol has a longitudinal chain having chain segments with the structures selected from the group consisting of —CH$_2$—, —O—, —C(=O)—, —(R)CH—, —(R)$_2$C— wherein R is selected from the group consisting of methyl, ethyl, propyl, isopropyl, normal butyl and isobutyl and not more than 8 percent of the number of hydrogens which would be bonded to carbon atoms along the longitudinal chain are substituted with R, wherein the main longitudinal chain is terminated with hydroxyl group or R is substituted with hydroxyl group if R is not more than four carbons of a terminal carbon from the longitudinal chain.

24. A formulated coating composition as recited in claims 2, 22 or 23 wherein the polymeric vehicle comprises from about 15 to about 50 weight percent oligoester diol, from about 10 to about 50 weight percent hardener and from about 10 to about 40 weight percent crosslinker.

25. A formulated coating composition as recited in claim 2 wherein the crystalline polyol consists essentially of atoms selected from the group consisting of carbon, hydrogen, oxygen and nitrogen atoms, the nitrogen atom forming a part of a nitrogen group selected from the group consisting of an amide group, an urea group and an amidine group.

26. A formulated coating composition as recited in claims 2, 22, 23 or 25 wherein the substantially linear oligoester polyol has a branching index of not more than about 0.12 wherein the branching index is defined by the formula $$\text{branching index} = \frac{(C_s + 2C_d) B_1}{C_1 + C_s + 2C_d} \ ;$$

Where $C_1$=the average number of linear segments per oligomer molecule;

$C_s$=the average number of segments with single branches per molecule;

$C_d$=the average number of segments with double branches per molecule;

$B_1$=the average length, in carbon and oxygen atoms, of branches.

27. A formulated coating composition as recited in claims 2, 23 or 25 wherein the crystalline polyol has a melting point of from about 5° C. to about 40° C. below a baking temperature which ranges from about 70° to about 175° C.

28. A formulated coating composition as recited in claims 2, 22 or 23 wherein the composition further includes a catalyst.

29. A polymeric vehicle as recited in claim 3 wherein the oligoester diol, the hardener and the crosslinker are in a ratio effective to provide a coating binder having a pencil hardness of at least about B when applied to a substrate at about one mil dry.

30. A polymeric vehicle as recited in claim 3 or 29 wherein the oligoester diol is terminated with hydroxyl groups and has a longitudinal chain having chain segments with the structures selected from the group consisting of —C—, —O—, —C(=O)—, —(R)CH—, —(R)$_2$C— wherein R is selected from the group consisting of methyl, ethyl, propyl, isopropyl, normal butyl and isobutyl and not more than 8 percent of the number of hydrogens which would be bonded to carbon atoms along the longitudinal chain are substituted with R, wherein the main longitudinal chain is terminated with hydroxyl group or R is substituted with hydroxyl group if R is not more than four carbons of a terminal carbon of the longitudinal chain.

31. A polymeric vehicle as recited in claim 3 wherein the crystalline polyol consists essentially of atoms selected from the group consisting of carbon, hydrogen, oxygen and nitrogen atoms, the nitrogen atom forming a part of a nitrogen group selected from the group consisting of an amide group, an urea group and an amidine group.

32. A polymeric vehicle as recited in claims 3, 29 or 31 wherein the substantially linear oligoester polyol has a branching index of not more than about 0.12 wherein the branching index is defined by the formula $$\text{branching index} = \frac{(C_s + 2C_d) B_1}{C_1 + C_s + 2C_d} \; ;$$

Where $C_1$=the average number of linear segments per oligomer molecule;

$C_s$=the average number of segments with single branches per molecule;

$C_d$=the average number of segments with double branches per molecule;

$B_1$=the average length, in carbon and oxygen atoms, of branches.

33. A polymeric vehicle as recited in claims 3, 29 or 31 wherein the polydispersity index of the oligoester diol is not more than 1.8.

34. A polymeric vehicle as recited in claims 3, 29 or 31 wherein the crystalline polyol has a melting point of from about 5° C. to about 40° C. below a baking temperature which ranges from about 70° to about 175° C.

35. A polymeric vehicle as recited in claims 3 or 29 wherein the oligoester diol has the general formula $$\text{HO(CH}_2)_m\text{—[OOC(CH}_2)_n\text{COO(CH}_2)_m]_p\text{O—H}$$

wherein p>1 and <6, m=2 to 16, n=0 to 12.

36. A polymeric vehicle as recited in claims 3 or 29 wherein the mesogenic polyol has the general formula $$R_o\text{-F-E-F-}R_o$$

wherein

E is selected from the group consisting of

G is selected from the group consisting of —COO—,

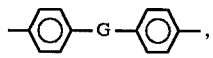,

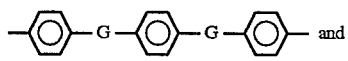 and

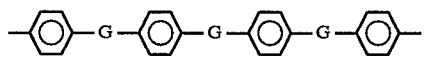

—OOC—, —CH$_2$O—, —OCH$_2$—, —N=C—, and
                                              |
                                              R'

—C=N—;
   |
   R' wherein

R' is selected from the group consisting of —CH$_3$ and H;

F is selected from the group consisting of —O—, —COO— and —OOC—; $R_o$ is an aliphatic group having from 4 to 30 carbons and at least one hydroxyl group; and wherein any hydroxyl group included in $R_o$ is spaced from F by at least one carbon atom.

37. A polymeric vehicle as recited in claim 36 wherein the oligoester diol is terminated with hydroxyl groups and has a longitudinal chain having chain segments with the structures selected from the group consisting of —CH$_2$—, —O—, —C(=O)—, —(R)CH—, —(R)$_2$C— wherein R is selected from the group consisting of methyl, ethyl, propyl, isopropyl, normal butyl and isobutyl and not more than 8 percent of the number of hydrogens which would be bonded to carbon atoms along the longitudinal chain are substituted with R, wherein the main longitudinal chain is terminated with hydroxyl group or R is substituted with hydroxyl group if R is not more than four carbons of a terminal carbon of the longitudinal chain.

38. A polymeric vehicle as recited in claim 36 wherein $R_o$ is an adduct of a monoxirane having not more than about 25 carbon atoms.

39. A polymeric vehicle as recited in claim 3 wherein the hardener is the mesogenic polyol and is effective for forming a dispersion in the formulated coating composition.

40. A polymeric vehicle as recited in claim 3 wherein he hardener is the mesogenic polyol, the mesogenic polyol has a number average molecular weight in the range of from about 186 to about 1000, a polydispersity index of not more than about 2.6 and is effective for forming a solution in the formulated coating composition.

41. A polymeric vehicle as recited in claim 31 wherein the crystalline polyol has a melting point of from about 5° C. to about 40° C. below a baking temperature which ranges from about 70° to about 175° C.

42. A polymeric vehicle as recited in claims 3, 39, 40 or 41 wherein the oligoester has a polydispersity index of not more than 1.8 and the oligoester diol and the hardener being in a ratio effective to provide a mixture comprising the oligoester diol, hardener and a crosslinker, which mixture will provide a coating binder having a pencil hardness of at least about H when applied to a substrate at about one mil dry.

* * * * *

UNITED STATES PATENT AND TRADEMARK OFFICE
CERTIFICATE OF CORRECTION

PATENT NO. : 5,641,854
DATED : June 24, 1997
INVENTOR(S) : Jones et al.

It is certified that error appears in the above-indentified patent and that said Letters Patent is hereby corrected as shown below:

Claim 2, column 35, line 52, change "U" to --u--.

Claim 3, column 37, line 51, after "d=1 or 2;" insert --u=A;--.

Claim 14, column 41, line 14, change "P<1 and <6," to --p>1 and <6,--.

Claim 17, column 41, line 49, change "he" to --the--.

Claim 30, column 42, line 64, change "-C-", to -- -CH$_2$- --.

Claim 40, column 44, line 40, change "he" to --the--.

Signed and Sealed this

Eighteenth Day of November 1997

Attest:

BRUCE LEHMAN

Attesting Officer

Commissioner of Patents and Trademarks